(12) United States Patent
Jin et al.

(10) Patent No.: US 9,979,492 B2
(45) Date of Patent: May 22, 2018

(54) METHOD OF SHARING AND RECEIVING INFORMATION BASED ON SOUND SIGNAL AND APPARATUS USING THE SAME

(71) Applicant: SAMSUNG ELECTRONICS CO., LTD., Suwon-si (KR)

(72) Inventors: Ho Jin, Yongin-si (KR); Jong-baek Kim, Yongin-si (KR); Sung-ho Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/674,459

(22) Filed: Mar. 31, 2015

(65) Prior Publication Data

US 2015/0280836 A1 Oct. 1, 2015

(30) Foreign Application Priority Data

Mar. 31, 2014 (KR) ........................ 10-2014-0037959

(51) Int. Cl.
*H04B 11/00* (2006.01)
*H04M 1/725* (2006.01)
*H04M 1/215* (2006.01)

(52) U.S. Cl.
CPC .......... *H04B 11/00* (2013.01); *H04M 1/7253* (2013.01); *H04M 1/215* (2013.01)

(58) Field of Classification Search
CPC .................................................. H04W 4/008
USPC ...... 455/414.1, 466; 367/117, 197; 715/863, 715/865
See application file for complete search history.

(56) References Cited

U.S. PATENT DOCUMENTS

| | | | |
|---|---|---|---|
| 9,125,004 B2* | 9/2015 | Kamal | H04W 4/008 |
| 2006/0116861 A1 | 6/2006 | Kaplan et al. | |
| 2009/0070708 A1 | 3/2009 | Finkelstein | |
| 2010/0112991 A1* | 5/2010 | Hannaby | H04M 1/2155 |
| | | | 455/414.3 |
| 2010/0156812 A1* | 6/2010 | Stallings | G06F 3/04883 |
| | | | 345/173 |
| 2011/0083111 A1 | 4/2011 | Forutanpour et al. | |
| 2011/0285658 A1* | 11/2011 | Homma | G06F 1/1626 |
| | | | 345/173 |

(Continued)

FOREIGN PATENT DOCUMENTS

KR 10-0731284 B1 6/2007
KR 10-2010-0087422 A 8/2010

OTHER PUBLICATIONS

International Search Report dated Jul. 1, 2015 issued by International Searching Authority in counterpart International Application No. PCT/KR2015/003145.

(Continued)

*Primary Examiner* — Kevin Kim
(74) *Attorney, Agent, or Firm* — Sughrue Mion, PLLC

(57) ABSTRACT

A method of sharing information by an information-providing device, the method including: determining, by the information-providing device, information of interest based on a first input to the information-providing device; generating, by the information-providing device, a sound signal including object information; and outputting, by the information-providing device, the sound signal, wherein the object information includes object identification information configured to be used to identify the information of interest.

13 Claims, 15 Drawing Sheets

(56) References Cited

U.S. PATENT DOCUMENTS

2013/0173715 A1\* 7/2013 Song ............... H04L 65/60
  709/205
2013/0217335 A1  8/2013 Huibers et al.
2014/0335787 A1\* 11/2014 Smadi ............ H04L 67/06
  455/41.2
2015/0295962 A1\* 10/2015 Zheng ............ H04L 67/06
  709/204

OTHER PUBLICATIONS

Written Opinion dated Jul. 1, 2015 issued by International Searching Authority in counterpart International Application No. PCT/KR2015/003145.

\* cited by examiner

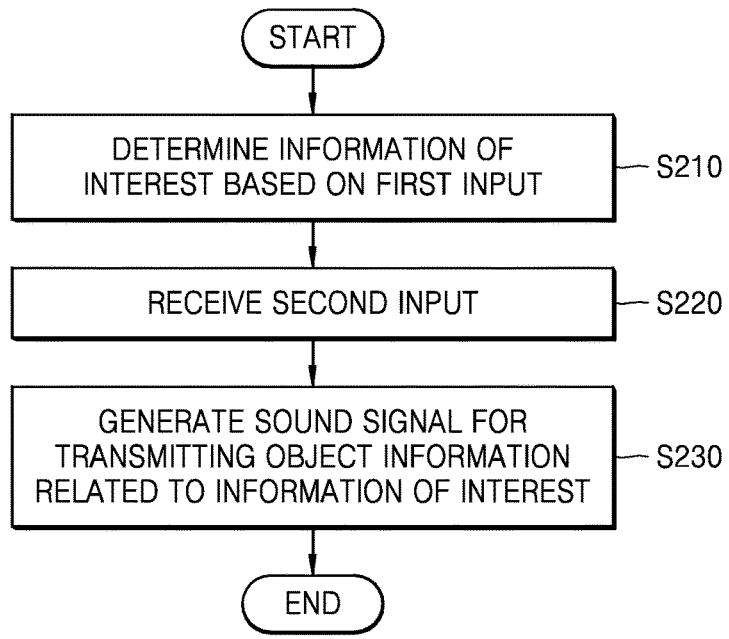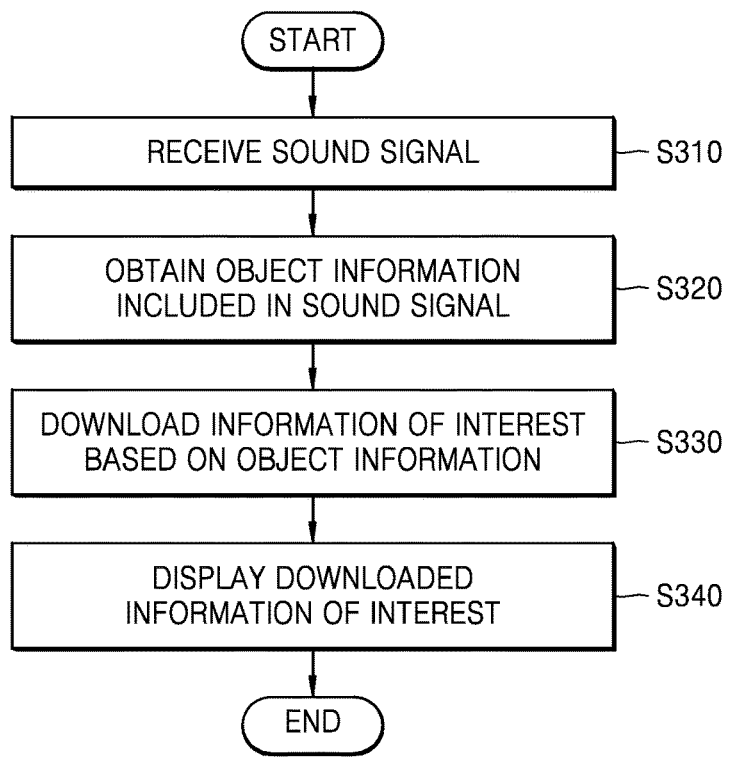

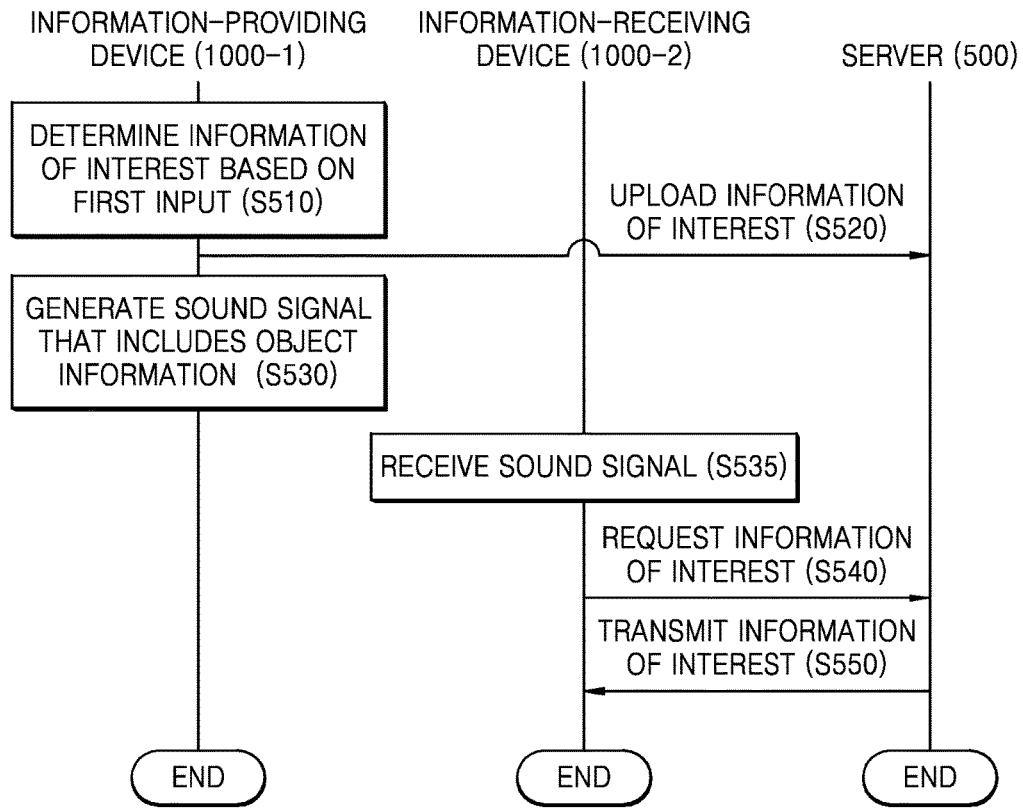
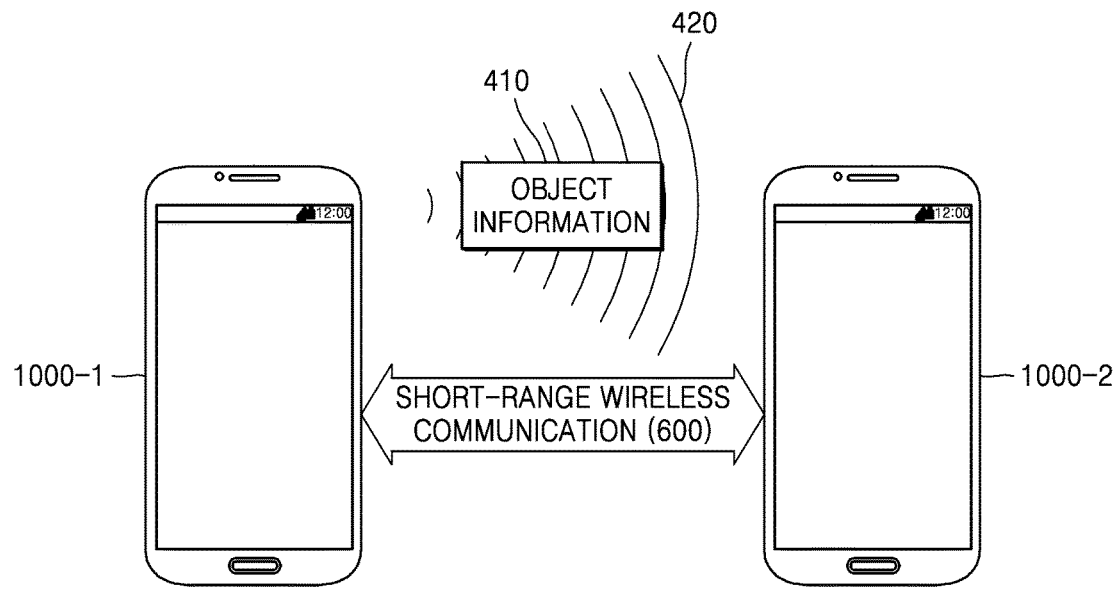

FIG. 17
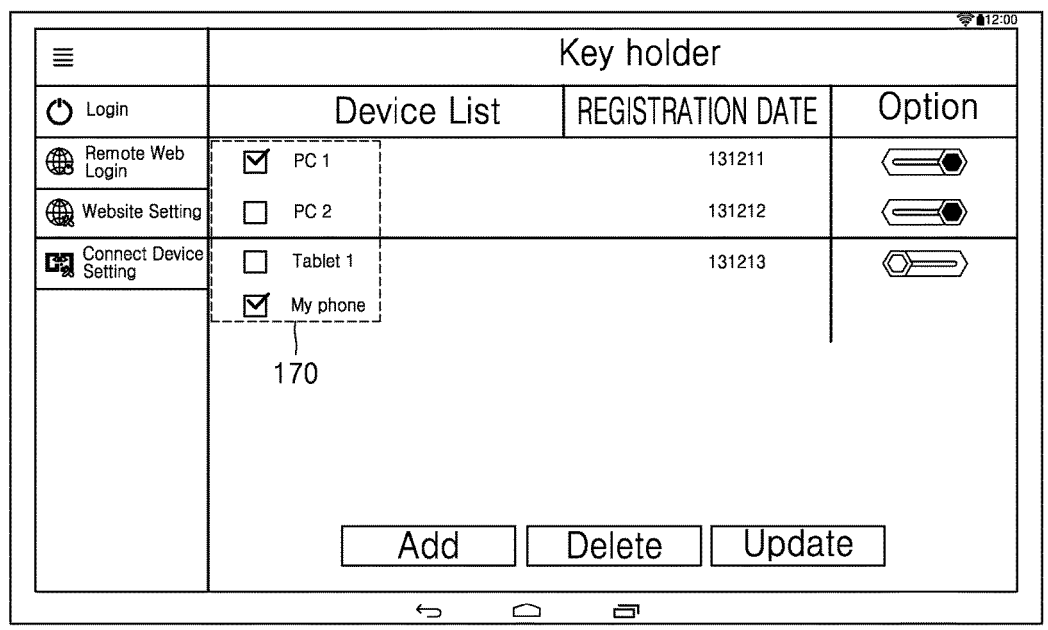
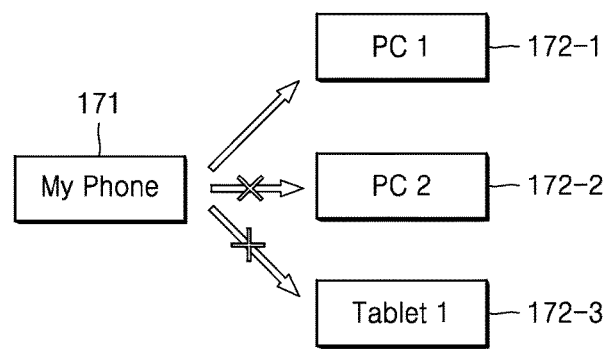

METHOD OF SHARING AND RECEIVING INFORMATION BASED ON SOUND SIGNAL AND APPARATUS USING THE SAME

RELATED APPLICATION

This application claims the benefit of Korean Patent Application No. 10-2014-0037959, filed on Mar. 31, 2014, in the Korean Intellectual Property Office, the disclosure of which is incorporated herein by reference in its entirety.

BACKGROUND

1. Field

Aspects of the exemplary embodiments relate to a method of sharing information stored in a device with another device, and an apparatus using the same.

2. Description of the Related Art

Various types of devices that can transmit and receive data have been supplied. For example, a smartphone, a personal digital assistant (PDA), a table personal computer (PC), a smart television (TV), a cellular phone, a laptop computer, and a PC are widely available. Such devices may provide various data transmission services as well as additional services.

As the variety of devices has increased, a need for transmitting information, such as an image, a video clip, or text from one device to another device has also increased. In a related art, wireless communication, for example, Bluetooth™ communication is established between devices, and information is transmitted using the established wireless communication. Alternatively, a device uploads information to a server, and then another device accesses the server and downloads the information from the server.

However, in the related art, a user may need to establish or alter communication settings for a wireless communication connection. Additionally, the user may need to undergo a user authentication process on the server to access the server and search for information before the information may be downloaded.

Additionally, the user may need to specifically select information to be shared with the other device, in order to transmit the information.

SUMMARY

Aspects of one or more exemplary embodiments relate to a method and an apparatus for determining information to be shared, by specifying information of interest based on information input to a device by a user, even if the user does not additionally select the information to be shared.

Aspects of one or more exemplary embodiments relate to a method and an apparatus for providing information to a neighboring device using a sound signal, without having to perform a process of establishing a communication connection or searching for information.

According to an aspect of one or more exemplary embodiments, there is provided a method of an information-providing device of sharing information, the method including: determining, by the information-providing device, information of interest based on a first input to the information-providing device; generating, by the information-providing device, a sound signal comprising object information; and outputting, by the information-providing device, the sound signal, wherein the object information comprises object identification information configured to identify the information of interest.

The information-providing device includes a display, the first input comprises an input indicating a selection of a part of content displayed on the display, and the determining the information of interest comprises determining the selected part of the content as the information of interest.

The method may further include generating, by the information-providing device, an image by capturing a part of a screen displayed on the display, and the determining may include determining the generated image as the information of interest.

The information-providing device includes a sensor configured to sense a movement of the information-providing device, the method further includes receiving, by the information-providing device, a second input indicating the physical movement of the information-providing device detected by the sensor, and the generating of the sound signal comprises generating the sound signal in response to the second input.

The method further includes: uploading, by the information-providing device, the information of interest to a server; and receiving, by the information-providing device, the object identification information from the server. The generating of the sound signal further includes generating the sound signal based on the received object identification information.

The object information further includes at least one selected from among a command to download the information of interest to be performed by an information-receiving device, user identification information, device identification information, and a token configured to be used to determine whether a request for the information of interest is valid.

The uploading comprises transmitting authentication information configured to be used to authenticate an information-receiving device to the server.

The method further includes registering an information-receiving device, which is to receive the information of interest, in the server.

The information-providing device may include a display, the method may further include displaying, on the display, an information-of-interest determining button configured to receive the first input, and the determining the information of interest may include receiving the first input using the information-of-interest determining button.

According to aspects of one or more exemplary embodiments, there is provided a method of an information-receiving device of receiving information from an information-providing device, the method including: receiving, by the information-receiving device, a sound signal comprising object information; obtaining, by the information-receiving device, the object information included in the sound signal; downloading, by the information-receiving device, information of interest based on the object information; and outputting, by the information-receiving device, the downloaded information of interest, wherein the object information includes object identification information configured to be used to identify the information of interest.

The information of interest may include an image generated by capturing a part of a screen displayed on a display of the information-providing device.

The downloading of the information of interest may include: transmitting, by the information-receiving device, a request comprising the object identification information to a server; and receiving, by the information-receiving device, the information of interest from the server in response to the request.

The object information further may include at least one selected from among a command to perform a process of downloading the information of interest by the information-receiving device, user identification information, device identification information, and a token configured to be used to determine whether the request for the information of interest is valid.

The downloading the information of interest may include obtaining authentication information input by a user, and the request transmitted to the server may further include the obtained authentication information.

The sound signal may include group identification information configured to be used to determine whether the information-receiving device is a device which is to receive the information of interest, the method may further include determining whether the information-receiving device is a device that is to receive the information of interest based on the group identification information, and the downloading of the information of interest may include downloading the information of interest in response to the information-receiving device being determined to be a device which is to receive the information of interest.

According to aspects of one or more exemplary embodiments, there is provided a method of sharing information, which is performed by a system that includes an information-providing device, an information-receiving device, and a server, the method including: determining, by the information-providing device, information of interest based on a first input to the information-providing device; uploading, by the information-providing device, the determined information of interest to the server; transmitting, by the server, object identification information configured to be used to identify the uploaded information of interest to the information-providing device; generating, by the information-providing device, a sound signal comprising the object information; transmitting, by the information-receiving device, a request comprising the object identification information, to the server; and transmitting, by the server, the uploaded information of interest to the information-receiving device in response to the request, wherein the object information comprises the object identification information.

The information-providing device may include a display, the first input may include an input indicating a selection of a part of content displayed on the display, and the determining of the information of interest may include determining, by the information-providing device, the selected part of the content as the information of interest.

The method may further include generating, by the information-providing device, an image by capturing a part of a screen displayed on the display, in response to the first input, and the determining may include determining, by the information-providing device, the generated image as the information of interest.

The information-providing device may include a sensor configured to sense a movement of the information-providing device, the method may further include receiving, by the information-providing device, a second input indicating the physical movement of the information-providing device detected by the sensor, and the generating of the sound signal may include generating, by the information-providing device, the sound signal in response to the second input.

The object information may further include at least one selected from among a command to download the information of interest to be performed by the information-receiving device, user identification information, device identification information, and a token configured to be used to determine whether the request for the information of interest is valid.

The transmitting the information of interest to the server may include transmitting, by the information-providing device, first authentication information configured to be used to authenticate the information-receiving device, the transmitting the request may include: receiving, by the information-receiving device, second authentication information from a user; and transmitting, by the information-receiving device, the received second authentication information to the server, and the transmitting, by the server, of the information of interest may include transmitting, by the server, the information of interest if the first authentication information received by the server from the information-providing device matches the second authentication information received by the server from the information-receiving device.

The method may further include registering, by the information-providing device, the information-receiving device, which is to receive the information of interest, in the server.

According to aspects of one or more exemplary embodiments, there is provided a non-transitory computer-readable recording storage medium having stored thereon a computer program, which when executed by a computer, performs the one or more of the above methods.

According to aspects of one or more exemplary embodiments, there is provided an information-providing device including: a user interface configured to receive a first input; a processor configured to determine information of interest based on the first input; and an audio output unit configured to generate a sound signal comprising object information corresponding to the information of interest, wherein the object information comprises object identification information configured to be used to identify the information of interest.

The information-providing device may further include a display, the first input may include a touch input indicating a selection of a part of content displayed on the display, and the processor may be further configured to determine the selected part of the content as the information of interest.

The processor may be further configured to: generate an image by capturing a part of a screen displayed on the display, in response to the first input, and determine the generated image as the information of interest.

The user interface may further include a sensor configured to detect physical movement of the information-providing device, and the audio output unit may be configured to generate the sound signal in response to a second input indicating the physical movement of the information-providing device being detected by the sensor.

The information-providing device may further include a transceiver configured to transmit the information of interest to a server, and to receive the object identification information from the server, and the audio output unit may be configured to generate the sound signal based on the received object identification information.

The object information may further include at least one selected from among a command to download the information of interest to be performed by an information-receiving device, user identification information, device identification information, and a token configured to be used to determine whether a request for the information of interest is valid.

The transceiver may be further configured to transmit authentication information configured to be used to authenticate an information-receiving device to the server.

The transceiver may be further configured to register device identification information of the information-receiving device, which is to receive the information of interest, in the server.

The information-providing device may further include: a display configured to display an information-of-interest determining button, and the first input may include a selection of the displayed information-of-interest determining button using the user interface.

According to aspects of one or more exemplary embodiments, there is provided an information-receiving device including: a user interface configured to receive a sound signal comprising object information; a processor configured to obtain the object information included in the sound signal; a transceiver configured to download information of interest based on the object information; and a display unit configured to display the information of interest, wherein the object information comprises object identification information configured to be used to identify the information of interest.

The information of interest may include an image generated by capturing a part of a screen displayed on the display.

The transceiver may be further configured to transmit a request including the object identification information to a server, and to receive the information of interest from the server in response to the request.

The object information may further include at least one selected from among a command to download the information of interest to be performed by the information-receiving device, user identification information, device identification information, and a token configured to be used to determine whether a request for the information of interest with respect to the server is valid.

The user interface may be further configured to receive an input of authentication information from a user, and the transceiver may be further configured to transmit the input authentication information to the server.

The sound signal may further include group identification information configured to be used to determine whether the information-receiving device is a device which is to receive the information of interest, the processor may be further configured to determine whether the information-receiving device is a device that is to receive the information of interest based on the group identification information, and the transceiver may be further configured to download the information of interest if the determiner determines that the information-receiving device is a device that is to receive the information of interest.

According to aspects of one or more exemplary embodiments, there is provided a mobile device including: a touch-screen; a speaker; and a controller configured to determine information of interest based on a touch input received by the touch-screen, to generate a sound signal in a format to be recognized by another device, the sound signal corresponding to the determined information of interest, and to control the speaker to output the generated sound signal.

The controller may be further configured to control the speaker to output the sound signal in a frequency higher than an auditory range.

The controller may be further configured to generate the sound signal to further correspond to information for the another device to connect with the mobile device.

The mobile device may further include a transceiver, and the controller may be further configured to control the transceiver to connect with the another device and to transmit the information of interest.

According to one or more exemplary embodiments, there is provided a mobile device including: a microphone configured to receive a sound signal; a transceiver; and a controller configured to derive object information from the received sound signal, the object information corresponding to shared information to be obtained by the mobile device, and to control the transceiver to obtain the shared information based on the object information.

The mobile device may further include a speaker, and the controller may be further configured to control the speaker to output the obtained shared information.

The microphone may be configured to receive the sound signal in a frequency higher than an auditory range.

The controller may be further configured to derived connection information from the received sound signal, the connection information configured to be used to connect with another device.

The controller may be further configured to control the transceiver to establish a connection with the another device and to obtain the shared information from the another device.

Additional aspects will be set forth in part in the description which follows and, in part, will be apparent from the description, or may be learned by practice of one or more exemplary embodiments.

BRIEF DESCRIPTION OF THE DRAWINGS

These and/or other aspects will become apparent and more readily appreciated from the following description of one or more exemplary embodiments, taken in conjunction with the accompanying drawings in which:

FIG. 2 is a flowchart of a process of sharing information performed by an information-providing device according to some exemplary embodiments;

FIG. 3 is a flowchart of a process of receiving information performed by an information-receiving device according to some exemplary embodiments;

FIG. 5 is a sequence diagram of a process of sharing information according to some exemplary embodiments;

FIG. 6 illustrates a system for sharing information according to some exemplary embodiments;

FIG. 17 illustrates a conceptual diagram of a method of providing information of interest to a registered device according to some exemplary embodiments;

DETAILED DESCRIPTION

Figure 1:
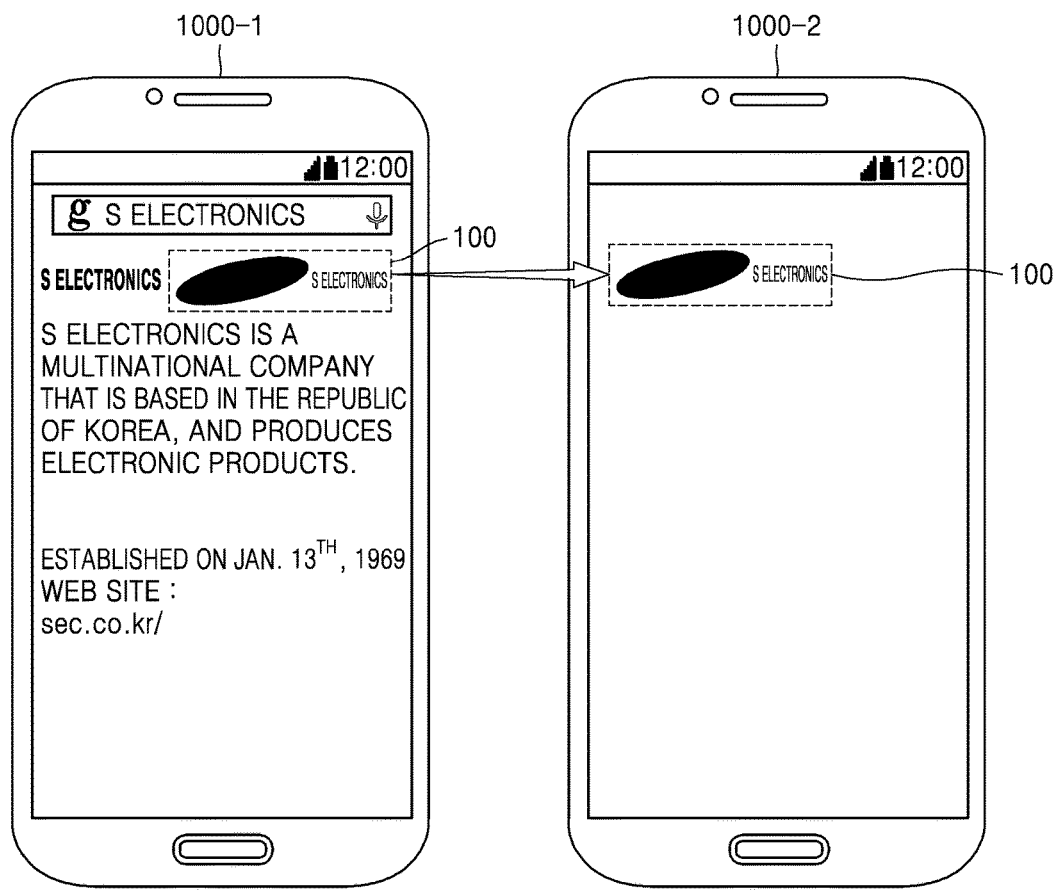
FIG. 1 illustrates a conceptual diagram of a method of sharing information of interest according to some exemplary embodiments.

Reference will now be made in detail to one or more exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. Accordingly, the exemplary embodiments are described below, by referring to the figures, to explain various aspects of one or more exemplary embodiments. Certain detailed explanations of the related art may be omitted when it is deemed that they may unnecessarily obscure the essence of one or more exemplary embodiments. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

"Information of interest", described herein, refers to information that is to be shared between devices. The "information of interest" may be data in various forms, such as, as non-limiting examples, text, an image, a video clip, or location information, for example, uniform resource locator (URL) information.

An information-providing device or an information-receiving device refers to a device that may transmit or receive information. For example, the information-providing device or the information-receiving device may include one selected from among a smartphone, a personal digital assistant (PDA), a tablet personal computer (PC), a smart television (TV), a cellular phone, a laptop computer, and a PC. The information-providing device and the information-receiving device may be devices of a same type or devices of different types.

Hereinafter, one or more exemplary embodiments will be described more fully with reference to the accompanying drawings.

FIG. 1 illustrates a conceptual diagram of a method of sharing information of interest according to some exemplary embodiments.

According to some exemplary embodiments, an information-providing device 1000-1 may determine the information of interest. The information-providing device 1000-1 may provide the determined information of interest to an information-receiving device 1000-2.

Referring to FIG. 1, the information-providing device 1000-1 may capture an image 100 of a part of an area of a screen displayed on a display included in the information-providing device 1000-1 according to a user input. "Capture", used herein, refers to an operation of storing an image of a part of or whole area of a screen displayed on a device as a binary file or in a clipboard. The information-providing device 1000-1 may generate an image 100 by capturing the part of the screen. If the information-providing device 1000-1 performs a capturing operation according to a user input, the information-providing device 1000-1 may determine the generated image 100 as the information of interest.

As the image 100 is determined as the information of interest, the information-providing device 1000-1 may provide the image 100 to the information-receiving device 1000-2. The information-providing device 1000-2 may output the provided captured image 100.

FIG. 2 is a flowchart of a process of sharing information performed by the information-providing device 1000-1 according to some exemplary embodiments.

In operation S210, the information-providing device 1000-1 may determine the information of interest based on a first input. The first input may be information input by a user using an input device, i.e. a user interface, an input interface, or an input unit, included in the information-providing device 1000-1. For example, the first input may be a touch input made via a touchscreen of the information-providing device 1000-1. As another example, the first input may be a key input made via a key pad included in the information-providing device 1000-1. Additionally, the first input may be an input stored in the information-providing device 1000-1, or an input related to content which may be output by the information-providing device 1000-1. For example, the first input may be an input selecting at least a part of content, such as an image, text, a video clip, or a file list, which is displayed on a display included in the information-providing device 1000-1. However, the first input is not limited thereto. The first input may vary according to one or more exemplary embodiments.

Figure 8:
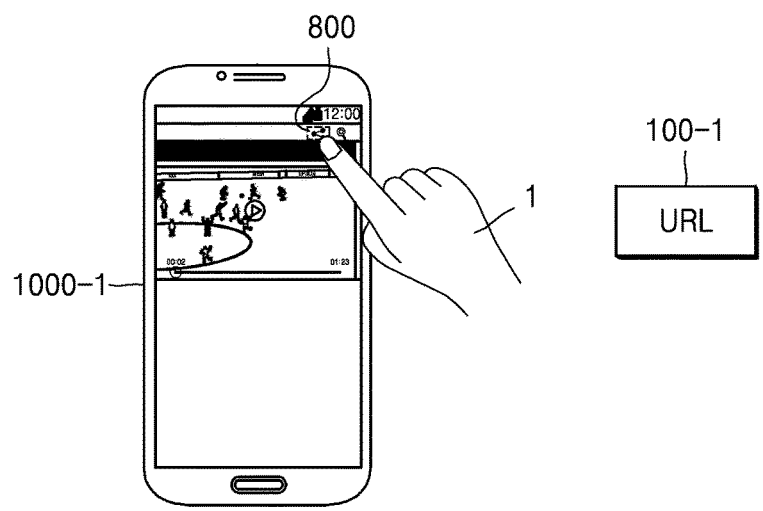
FIG. 8 illustrates a conceptual diagram of a method of determining a video clip as information of interest according to some exemplary embodiments.

Referring to FIG. 8, a conceptual diagram of a method of determining a video clip as the information of interest according to some exemplary embodiments is shown. According to some exemplary embodiments, the information-providing device 1000-1 may determine the information of interest using a button for determining information-of-interest. The information-providing device 1000-1 may play a video clip by streaming the video clip. The information-providing device 1000-1 may display a sharing button 800. The sharing button 800 refers to a user interface (UI) for sharing content, such as uploading a video clip to a social network service (SNS) or providing a video clip to another user. According to some exemplary embodiments, the information-providing device 1000-1 may use the sharing button 800 as the button for determining the information of interest. For example, if a user 1 selects the sharing button 800, the information-providing device 1000-1 may determine a URL 100-1 for streaming the video clip as the information of interest.

Figure 9:
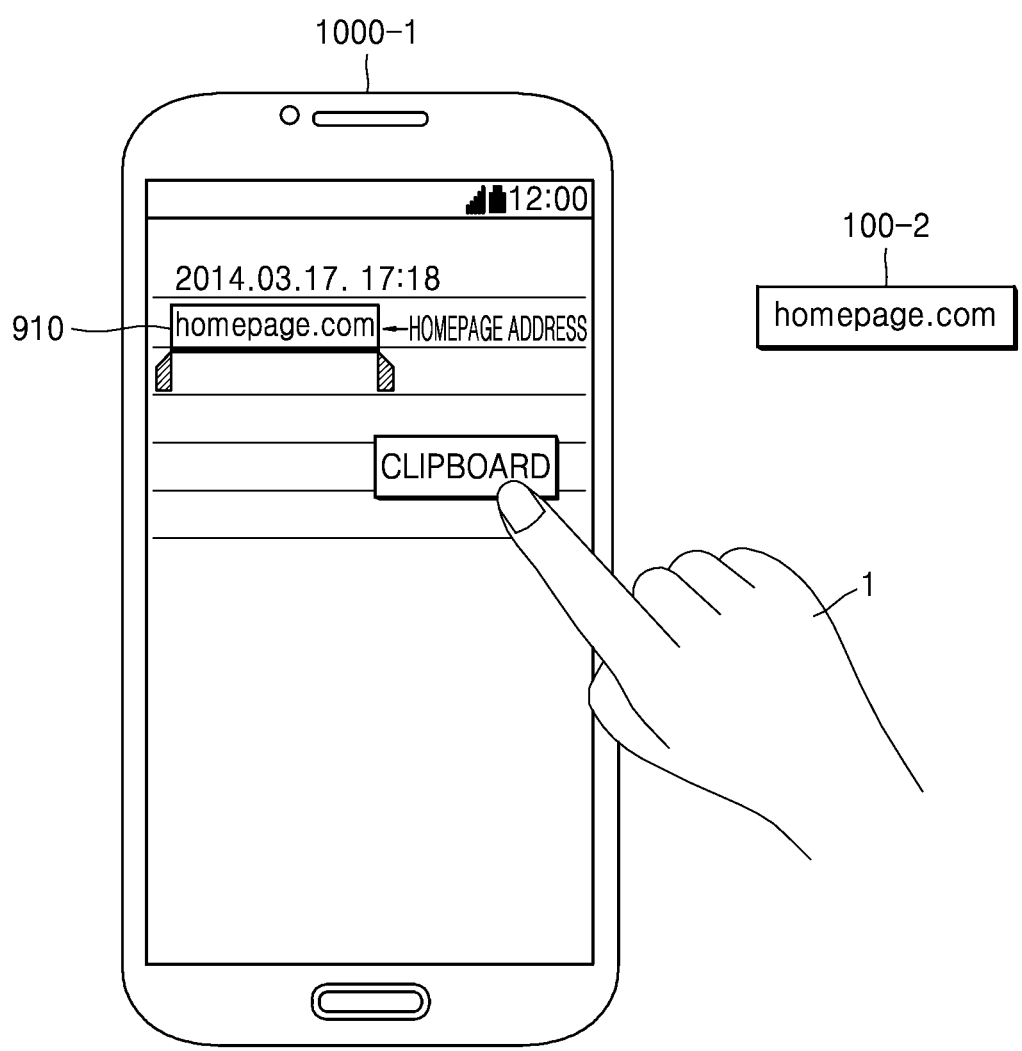
FIG. 9 illustrates a conceptual diagram of a method of determining text as information of interest according to some exemplary embodiments.

Referring to FIG. 9, a conceptual diagram of a method of determining text as the information of interest according to some exemplary embodiments is shown. According to some exemplary embodiments, the information-providing device 1000-1 may select at least a part 910 of text included in content. According to an input by the user 1, the information-providing device 1000-1 may store the selected at least part 910 of the text in a virtual clipboard in order to perform a function, such as copy or cut, with respect to the selected at least part 910 of the text. The information-providing device 1000-1 may determine text 100-2 stored in the clipboard as the information of interest.

Figure 10:
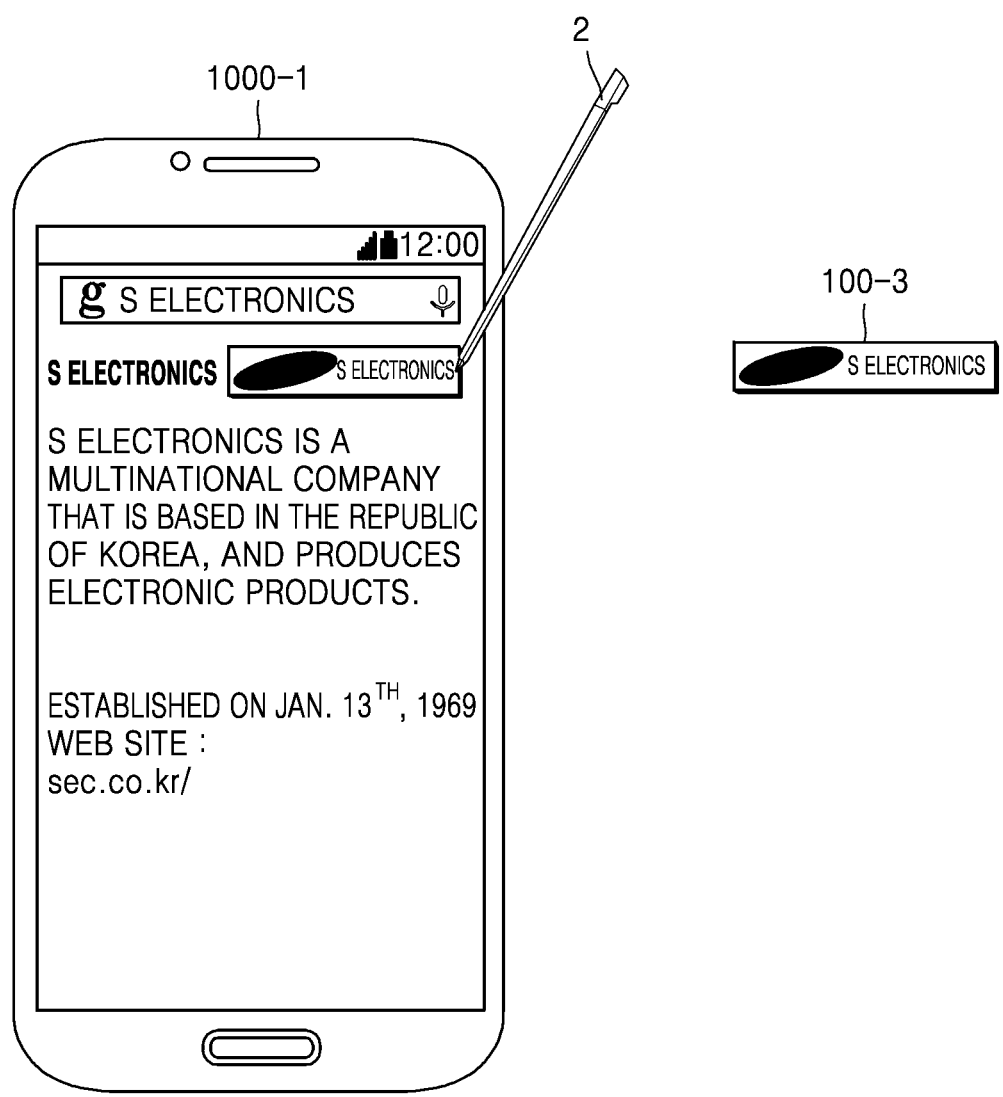
FIG. 10 illustrates a conceptual diagram of a method of determining an image as information of interest according to some exemplary embodiments.

Referring to FIG. 10, a conceptual diagram of a method of determining an image as the information of interest according to some exemplary embodiments is shown. According to some exemplary embodiments, the information-providing device 1000-1 may capture an image 100-3 that includes a part or whole of an area of a screen displayed on a display. For example, if a part of an area of the screen is selected using a stylus pen 2, the information-providing device 1000-1 may capture an image that includes the part of the area of the screen. As the information-providing device 1000-1 captures the image 100-3, the information-providing device 1000-1 may determine the captured image 100-3 as the information of interest.

Figure 11:
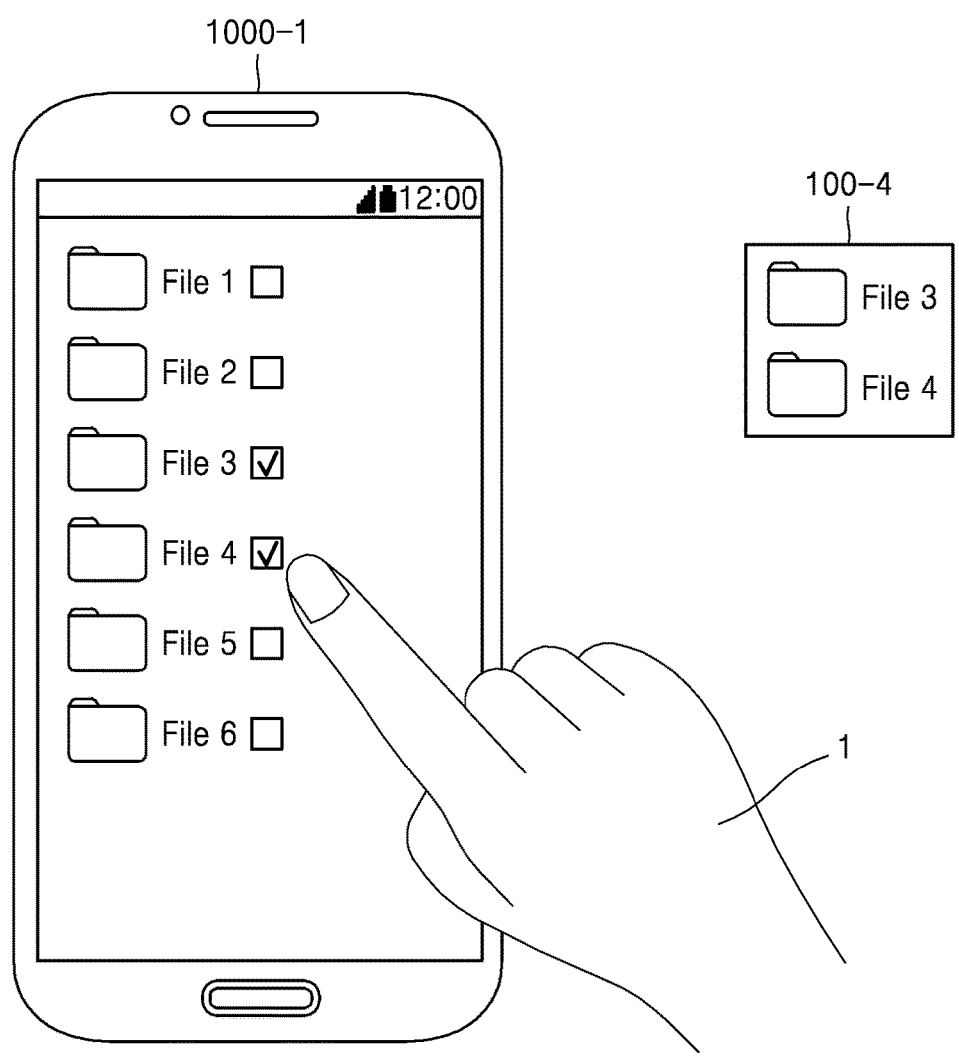
FIG. 11 illustrates a conceptual diagram of a method of determining a file as information of interest according to some exemplary embodiments.

Referring to FIG. 11, a conceptual diagram of a method of determining a file as the information of interest according to some exemplary embodiments is shown. According to some exemplary embodiments, the information-providing device 1000-1 may display a file list. If at least one file 100-4 included in the file list is selected according to an input by the user 1, the information-providing device 1000-1 may determine the selected at least one file 100-4 as the information of interest.

Then, referring back to FIG. 2, in operation S220, the information-providing device 1000-1 may receive a second input. A second input may be a command instructing the information-providing device 1000-1 to perform operation S230. In other words, the information-providing device 1000-1 may perform operation S230 in response to the second input. According to some exemplary embodiments, if a user holds and shakes the information-providing device 1000-1, the information-providing device 1000-1 may receive a second input indicating physical movement of the information-providing device 1000-1 which is detected by a sensor. The physical movement may be detected using an acceleration sensor or a gyroscope sensor. The second input may vary according to one or more particular exemplary embodiments. Additionally, according to some exemplary embodiments, operation S220 may not be performed.

Then, in operation S230, the information-providing device 1000-1 may generate a sound signal. The sound signal may include object information related to the information of interest. The object information refers to information based on which the information-receiving device 1000-2 that has received the sound signal may identify and obtain the information of interest. For example, the object information may include object identification information provided with respect to the information of interest. The object information is described in greater detail below with reference to FIGS. 14 and 15, and thus, a detailed description thereof is not provided here.

According to some exemplary embodiments, the information-providing device 1000-1 may generate a sound signal using a speaker. The information-providing device 1000-1 may generate a sound signal having a frequency higher than or equal to a highest audible frequency, so that the sound signal is not heard by a user. The highest audible frequency refers to a highest frequency at which a human may hear sound. The highest audible frequency may be 16 kHz. Since the information-providing device 1000-1 generally includes a speaker that may generate a sound signal having a frequency less than or equal to 20 kHz, the information-providing device 1000-1 may generate the sound signal including the object information in a frequency ranged from 16 kHz to 20 kHz. However, this is only an example, and a speaker may have a range greater than 20 kHz and the sound signal including the object information may be output at a frequency greater than 20 kHz.

Additionally, according to some exemplary embodiments, the process of sharing information may further include setting the information-receiving device 1000-2 which is to receive the information of interest, the setting being performed by the information-providing device 1000-1. In this case, in operation S230, the object information included in the sound signal generated by the information-providing device 1000-1 may include group identification information that is identification information about one or more intended recipient devices. The identification information about the information-receiving device 1000-2 may refer to identification information such as a media access control (MAC) address of the information-receiving device 1000-2.

FIG. 3 is a flowchart of a process of receiving information performed by the information-receiving device 1000-2, according to some exemplary embodiments.

In operation S310, the information-receiving device 1000-2 may receive a sound signal. According to some exemplary embodiments, the information-receiving device 1000-2 may receive a sound signal using a microphone.

Then, the information-receiving device 1000-2 may decode the sound signal. In operation S320, the information-receiving device 1000-2 may obtain object information included in the sound signal as a result of the decoding. According to some exemplary embodiments, the object information may include a command with respect to the information-receiving device 1000-2. The information-receiving device 1000-2 may execute the command included in the sound signal.

Additionally, according to some exemplary embodiments, the object information may include group identification information. If the object information includes the group identification information, the information-receiving device 1000-2 may determine whether identification information of the information-receiving device 1000-2 is included in the group identification information. If the identification information of the information-receiving device 1000-2 is not included in the group identification information, the information-receiving device 1000-2 may ignore the received sound signal, and not perform operations S330 and S340. However, if the identification information of the information-receiving device 1000-2 is included in the group identification information, the information-receiving device 1000-2 may perform S330 and S340 based on the object information included in the sound signal.

In other words, it is determined whether the information-receiving device 1000-2 is a device that is to receive the information of interest based on the group identification information, and, if the information-receiving device 1000-2 is a device that is to receive the information of interest based on the group identification information, the information-receiving device 1000-2 may download the information of interest.

In operation S330, the information-receiving device 1000-2 may download the information of interest based on the object information. According to some exemplary embodiments, the information-receiving device 1000-2 may identify the information of interest based on the object identification information included in the object information. For example, if the information of interest is stored in a server, the information-receiving device 1000-2 may transmit the object identification information to the server. After the server receives the object identification information, the server may transmit the information of interest to the information-receiving device 1000-2. Here, the server may be a server providing a cloud service. According to another exemplary embodiment, the information-receiving device 1000-2 may be connected to the information-providing device 1000-1 via a short-range wireless communication connection based on the object information. The object information may include connection information to connect with the information-providing device. The connection information may be for connecting to the short-range wireless communication. The connection information refers to device identification information of the information-providing device 1000-1 or information for setting a short-range wireless communication such as a protocol. The information-receiving device 1000-2 may download the information of interest from the information-providing device 1000-1 using the short-range wireless communication.

Then, in operation S340, the information-receiving device 1000-2 may display the downloaded information of interest. According to some exemplary embodiments, the information-receiving device 1000-2 may output the information of interest using another method according to a form of the information of interest. For example, if the information of interest is voice data, the information-receiving device 1000-2 may output the information of interest via a speaker. As another example, if the information of interest is a URL, the information-receiving device 1000-2 may output the information of interest by accessing a web page according to the URL.

Figure 4:
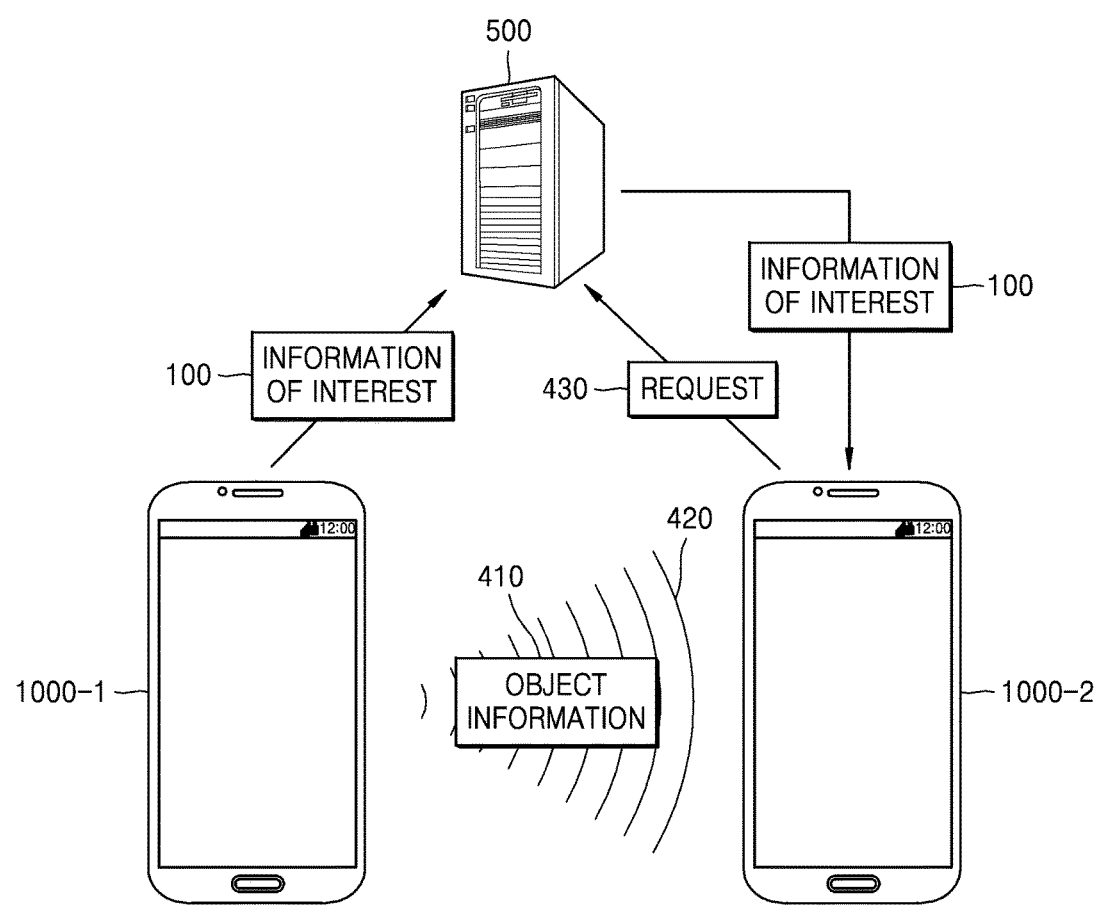
FIG. 4 illustrates a system for sharing information according to some exemplary embodiments.

FIG. 4 illustrates a system for sharing information according to some exemplary embodiments. FIG. 5 is a sequence diagram of a process of sharing information performed by devices included in the system, according to some exemplary embodiments.

In operation S510, the information-providing device 1000-1 may determine information 100 of interest based on a first input. The first input may be information input by a user using an input device included in the information-providing device 1000-1. For example, the first input may be a touch input made via a touchscreen of the information-providing device 1000-1. As another example, the first input may be a key input made via a key pad included in the information-providing device 1000-1. Additionally, the first input may be an input stored in the information-providing device 1000-1 or an input related to content which may be output by the information-providing device 1000-1. For example, the first input may be an input selecting at least a part of content, such as an image, text, a video clip, or a file list, which is displayed on a display included in the information-providing device 1000-1. However, the first input is not limited thereto. The first input may vary in accordance with various exemplary embodiments.

Referring to FIG. 8, the conceptual diagram of the method of determining a video clip as the information 100 of interest according to some exemplary embodiments is shown. According to some exemplary embodiments, the information-providing device 1000-1 may determine the information 100 of interest using a button for determining information 100 of interest. The information-providing device 1000-1 may play a video clip by streaming the video clip. The information-providing device 1000-1 may display a sharing button 800. The sharing button 800 refers to a UI for uploading a video clip to a social network service (SNS) or providing a video clip to another user. According to some exemplary embodiments, the information-providing device 1000-1 may use the sharing button 800 as the button for determining the information 100 of interest. For example, if a user 1 selects the sharing button 800, the information-providing device 1000-1 may determine a URL 100-1 for streaming the video clip as the information 100 of interest.

Referring to FIG. 9, the conceptual diagram of the method of determining text as the information 100 of interest according to some exemplary embodiments is shown. According to some exemplary embodiments, the information-providing device 1000-1 may select at least a part 910 of text included in content. According to an input by the user 1, the information-providing device 1000-1 may store the selected at least part 910 of the text in a virtual clipboard in order to perform a function, such as copy or cut, with respect to the selected at least part 910 of the text. The information-providing device 1000-1 may determine text 100-2 stored in the clipboard as the information 100 of interest.

Referring to FIG. 10, the conceptual diagram of the method of determining an image as the information 100 of interest according to some exemplary embodiments is shown. According to some exemplary embodiments, the information-providing device 1000-1 may capture an image 100-3 that includes a part or whole of an area of a screen displayed on a display. For example, if a part of an area of the screen is selected using a stylus pen 2, the information-providing device 1000-1 may capture an image that includes the part of the screen. As the information-providing device 1000-1 captures the image 100-3, the information-providing device 1000-1 may determine the captured image 100-3 as the information 100 of interest.

Referring to FIG. 11, the conceptual diagram of the method of determining a file as the information 100 of interest according to some exemplary embodiments is shown. According to some exemplary embodiments, the information-providing device 1000-1 may display a file list. If at least one file 100-4 included in the file list is selected according to an input by the user 1, the information-providing device 1000-1 may determine the selected at least one file 100-4 as the information 100 of interest.

Then, referring back to FIG. 5, in operation S520, the information-providing device 1000-1 may upload the information 100 of interest, determined in operation 510, to a server 500. According to some exemplary embodiments, the server 500 may be a server providing a cloud service. The server 500 may manage the uploaded information 100 of interest. For example, the server 500 may provide object identification information with respect to the uploaded information 100 of interest. The server 500 may index the information 100 of interest using device identification information of the information-providing device 1000-1 and the object identification information. The server 500 may transmit the object identification information, which is used to index the information 100 of interest, to the information-providing device 1000-1. The server 500 may transmit a token for checking a right to use a service for sharing information. However, the process described above of the server managing the object identification information is only an example, and exemplary embodiments are not limited thereto. As another example, the object identification information may be set by the information-providing device 1000-1. If the server 500 transmits the object identification information and the token to the information-providing device 1000-1, the server 500 may transmit a polling message for checking whether the transmission of the information has been normally performed to the information-providing device 1000-1.

Additionally, in operation S520, the information-providing device 1000-1 may upload metadata corresponding to the information 100 of interest to the server 500, instead of the information 100 of interest. The metadata of the information 100 of interest refers to secondary information in which information types are arranged so as to provide or enable access the information 100 of interest. For example, if the information 100 of interest is a video clip, the metadata of the information 100 of interest may include a title, a size, or playback time of the video clip, a URL for connecting to the information 100 of interest, or the like.

Then, in operation S530, the information-providing device 1000-1 may generate a sound signal 420. The sound signal 420 may include object information 410 related to the information 100 of interest. The object information 410 refers to information based on which the information-receiving device 1000-2 may identify and obtain the information 100 of interest. For example, the object information 410 may include object identification information provided with respect to the information 100 of interest. The object information 410 is described in greater detail below with reference to FIGS. 14 and 15, and thus, a detailed description thereof is not provided here.

According to some exemplary embodiments, the information-providing device 1000-1 may generate the sound signal 420 using a speaker. The information-providing device 1000-1 may generate the sound signal 420 having a frequency higher than or equal to a highest audible frequency, so that the sound signal 420 does not disturb a user. The highest audible frequency refers to a highest frequency at which a human may hear sound. The highest audible frequency may be 16 kHz. Since the general information-providing device 1000-1 includes a speaker that may generate the sound signal 420 having a frequency of less than or equal to 20 kHz, the information-providing device 1000-1 may generate the sound signal 420 including the object information 410 having a frequency ranged from 16 kHz to 20 kHz. Additionally, according to some exemplary embodiments, if a token is received from the server 500, the information-providing device 1000-1 may generate the sound signal 420 including the token.

According to some exemplary embodiments, in operation S530, if a second input is received, the information-providing device 1000-1 may generate the sound signal 420. For example, if physical movement of the information-providing device 1000-1 is detected using a sensor, the information-providing device 1000-1 may generate the sound signal 420. For example, when the information 100 of interest is selected, if a user holds and shakes the information-providing device 1000-1, the information-providing device 1000-1 may generate the sound signal 420 for sharing the information 100 of interest. However, this is merely an example, and the second input is not limited thereto.

In operation S535, the information-receiving device 1000-2 may receive the sound signal 420 generated by the information-providing device 1000-1. According to some exemplary embodiments, the information-receiving device 1000-2 may receive the sound signal 420 using a microphone. The information-receiving device 1000-2 may decode the received sound signal 420. The information-receiving device 1000-2 may obtain the object information 410 included in the sound signal 420 as a result of the decoding. According to some exemplary embodiments, the object information 410 may include object identification information, which is information for identifying the information 100 of interest. According to some exemplary embodiments, the object information 410 may further include a command to perform a process of downloading the information 100 of interest, user identification information about a user who uploaded the information 100 of interest to the server 500, and device identification information for identifying the information-providing device 1000-1. The process of downloading the information 100 of interest may include a process of requesting and receiving the information 100 of interest.

In operation S540, the information-receiving device requests the information 100 of interest from the server 500 by executing the command included in the object information 410. A request 430, transmitted from the server 500 in operation S540, may include the object identification information obtained from the sound signal 420. Additionally, if a token is included in the sound signal 420 received in operation S535, the request 430 may further include the token.

After the server 500 receives the request 430 from the information-receiving device 1000-2, the server 500 may transmit the information 100 of interest selected based on the received object identification information or metadata of the information 100 of interest to the information-receiving device 1000-2. The server 500 may determine whether the received request 430 is valid using the token received from the information-receiving device 1000-2. Additionally, the server 500 may transmit a reception notification message, which indicates that the information 100 of interest is transmitted to the information-receiving device 1000-2, to the information-providing device 1000-1. When the information-receiving device 1000-2 receives the information 100 of interest, the information-receiving device 1000-2 may output the received information 100 of interest.

Figure 7:
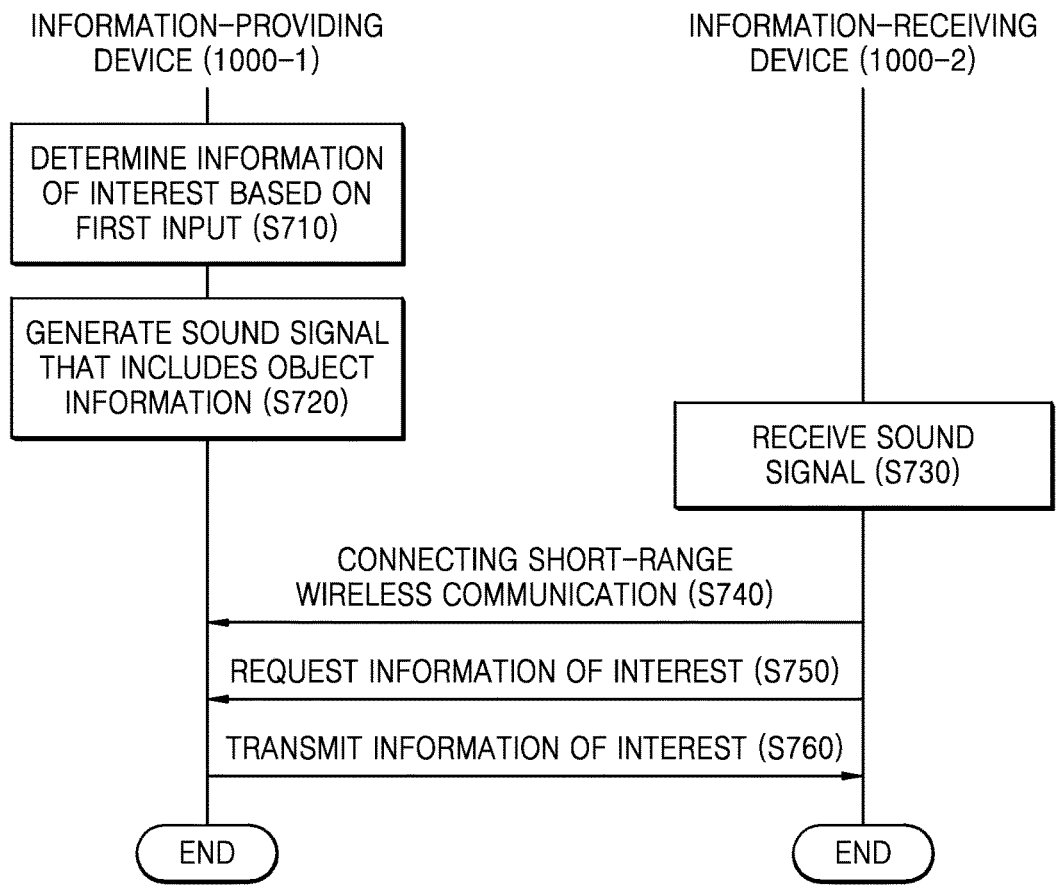
FIG. 7 is a sequence diagram of a process of sharing information according to some exemplary embodiments.

FIG. 6 illustrates a conceptual diagram of a system for sharing information according to one or more exemplary embodiments. FIG. 7 is a sequence diagram of a process of sharing information according to one or more exemplary embodiments.

In operation S710, the information-providing device 1000-1 may determine the information of interest based on a first input. The first input may be information input by a user using an input device included in the information-providing device 1000-1. For example, the first input may be a touch input made via a touchscreen of the information-providing device 1000-1. As another example, the first input may be a key input made via a key pad included in the information-providing device 1000-1. Additionally, the first input may be an input stored in the information-providing device 1000-1, or an input related to content which may be output by the information-providing device 1000-1. For example, the first input may be an input selecting at least a part of content, such as an image, text, a video clip, or a file list, which is displayed on a display included in the information-providing device 1000-1. However, the first input is not limited thereto, and may be variously modified. For example, the information-providing device 1000-1 may determine the information of interest using the input as shown in FIG. 8, 9, 10, or 11.

Then, in operation S720, the information-providing device 1000-1 may generate the sound signal 420. The sound signal 420 may include the object information 410 related to the information 100 of interest. The object information 410 may include information for the information-receiving device 1000-2 to identify and obtain the information 100 of interest. For example, the object information 410 may include object identification information corresponding to the information 100 of interest. The object information 410 is described in greater detail below with reference to FIGS. 14 and 15, and thus, a detailed description thereof is not provided here.

According to some exemplary embodiments, the information-providing device 1000-1 may generate the sound signal 420 using a speaker. The information-providing device 1000-1 may generate the sound signal 420 in a frequency higher than or equal to a highest audible frequency, so that the sound signal 420 does not disturb a user. The highest audible frequency refers to a highest frequency at which a human may hear sound. The highest audible frequency may be 16 kHz. The general information-providing device 1000-1 includes a speaker that may generate the sound signal 420 having a frequency less than or equal to 20 kHz, the information-providing device 1000-1 may generate the sound signal 420 having a frequency ranged from 16 kHz to 20 kHz. Additionally, if a token is received from the server 500, the information-providing device 1000-1 may generate the sound signal 420 including the token.

According to some exemplary embodiments, if a second input is received, the information-providing device 1000-1 may generate the sound signal 420 in operation S720. For example, if physical movement of the information-providing device 1000-1 is detected using a sensor, the information-providing device 1000-1 may generate the sound signal 420. For example, when the information 100 of interest is selected, if a user shakes the information-providing device 1000-1, the information-providing device 1000-1 may generate the sound signal 420 for sharing the information 100 of interest. This is merely an example and the second input is not limited thereto.

The sound signal 420 may further include connection information for establishing a short-range wireless communication 600. The short-range wireless communication 600 refers to a method of wireless communication which may be performed between a plurality of devices within a certain distance, such as Bluetooth™, near field communication (NFC), WiFi, or ZigBee. The connection information refers to information used when a device connects another device to the short-range wireless communication 600. For example, the connection information includes information such as device identification information of the information-providing device 1000-1 or a protocol.

In operation S730, the information-receiving device 1000-2 may receive the sound signal 420 generated by the information-providing device 1000-1. According to some exemplary embodiments, the information-receiving device 1000-2 may receive the sound signal 420 using a microphone. The information-receiving device 1000-2 may decode the received sound signal 420. The information-receiving device 1000-2 may obtain the object information 410 included in the sound signal 420 as a result of the decoding. The object information 410 may include object identification information that is information for identifying the information 100 of interest. According to some exemplary embodiments, the object information 410 may further include a command to perform a process of downloading the information 100 of interest, user identification information about a user who uploaded the information 100 of interest to the server 500, or device identification information for identifying the information-providing device 1000-1. The process of downloading the information 100 of interest may include an operation of establishing to the short-range wireless communication 600 and requesting the information 100 of interest.

In operation S740, the information-receiving device 1000-2 may connect to the information-providing device 1000-1 using the short-range wireless communication 600, based on the connection information included in the sound signal 420. In operation S750, the information-receiving device 1000-2 may request the information 100 of interest from the information-providing device 1000-1 using the short-range wireless communication 600 connection in operation S740. A request transmitted by the information-providing device 1000-1 in operation S750 may include the object identification information obtained from the sound signal 420.

In operation S760, the information-providing device 1000-1 that has received the request from the information-receiving device 1000-2 may transmit the information 100 of interest or metadata of the information 100 of interest to the information-receiving device 1000-2 using the short-range wireless communication 600. After the information-receiving information 1000-2 receives the information 100 of the interest, the information-receiving device 1000-2 may output the received information 100 of interest.

Figure 12:
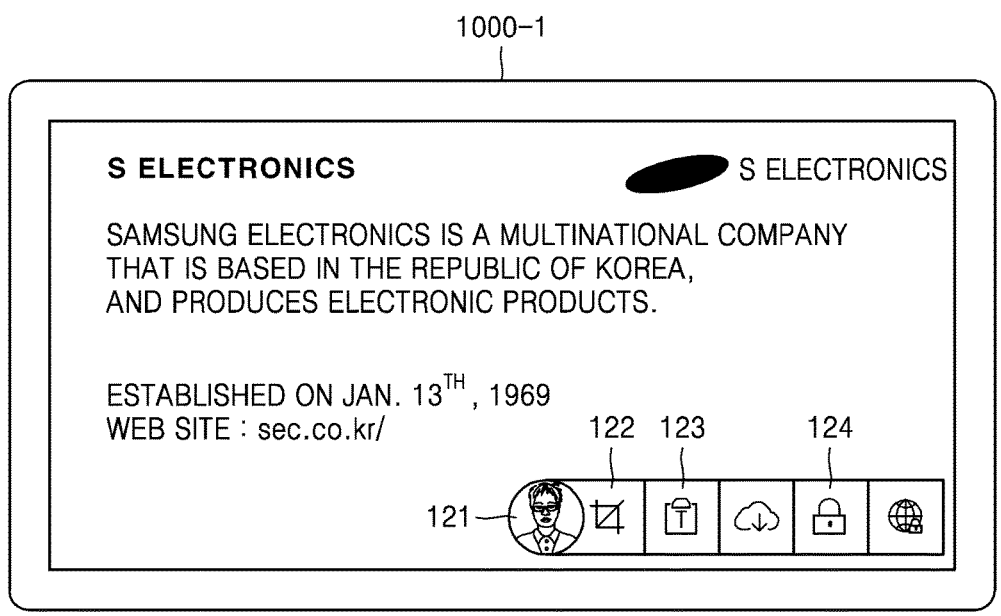
FIG. 12 illustrates a user interface (UI) for determining and sharing information of interest according to some exemplary embodiments.
Figure 13:
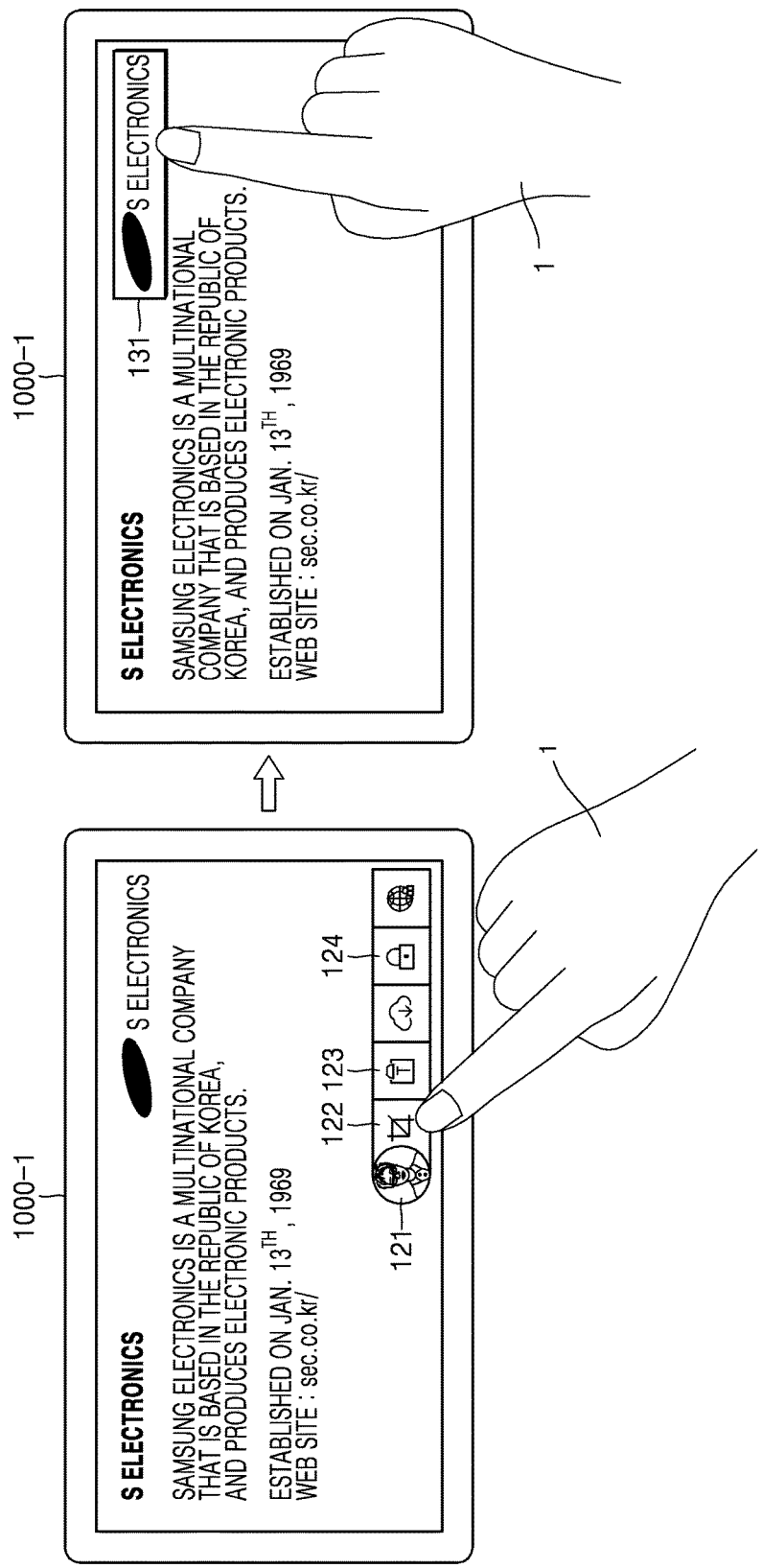
FIG. 13 illustrates a conceptual diagram of a method of determining information of interest using the UI shown in FIG. 12.

FIG. 12 illustrates a conceptual diagram of a UI 121 for determining and sharing the information of interest according to some exemplary embodiments. FIG. 13 illustrates a conceptual diagram of a method of determining the information of interest using the UI 121 shown in FIG. 12.

According to some exemplary embodiments, the information-providing device 1000-1 may display the UI 121 for determining and sharing the information of interest. The UI 121 may include an area selection button 122, a text selection button 123, and a security mode button 124. The area selection button 122 is an input button for determining the information of interest by selecting a part of an area of a screen displayed on the information-providing device 1000-1. The text selection button 123 is an input button for determining the information of interest by selecting text in content. The security mode button 124 is an input button for setting a security mode when the information of interest is shared. A security mode is described in greater detail below with reference to FIG. 16.

Referring to FIG. 13, the user 1 may select the area selection button 122 from among the buttons 122 through 124 included in the UI 121. Then, if the user 1 selects a part 131 of an area of the screen of the information-providing device 1000-1, the information-providing device 1000-1 may generate a screen included in the part 131 of the area as an image. The information-providing device 1000-1 may determine the generated image as the information of interest.

Figure 14:
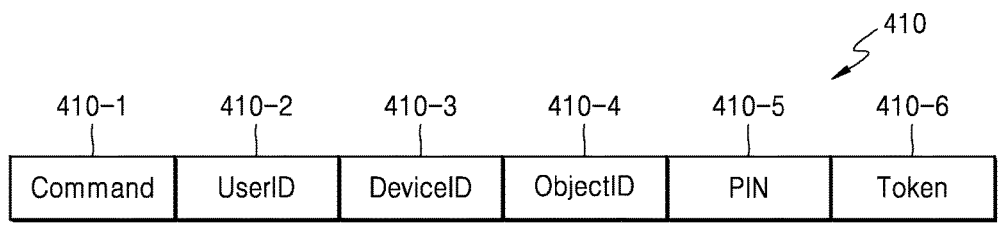
FIG. 14 illustrates a conceptual diagram of object information according to some exemplary embodiments.

FIG. 14 illustrates a conceptual diagram of the object information 410 according to some exemplary embodiments. The object information 410 may include a command 410-1, user identification information 410-2 (UserID), device identification information 410-3 (DeviceID), object identification information 410-4 (ObjectID), personal identification number information (PIN), and a token 410-6.

The command 410-1 may include a command instructing the information-receiving device 1000-2 that has obtained the object information 410 to obtain the information of interest. The user identification information 410-2 may refer to information for identifying a user of the information-providing device 1000-1. The device identification information 410-3 may include information for identifying the information-providing device 1000-1. The object identification information 410-4 may include information for identifying the information of interest to be shared. The PIN refers to a security number provided to identify a user. The PIN may be set by the information-providing device 1000-1. The PIN may indicate whether a security mode is set. If the PIN is set, the PIN may be required to be input into the information-receiving device 1000-2 in order to obtain the information of interest. The token 410-6 may refer to a unit that allows a device having the token 410-6 to obtain the information of interest that is to be shared. For example, the token may be a code required to gain access to the information of interest.

Figure 15:
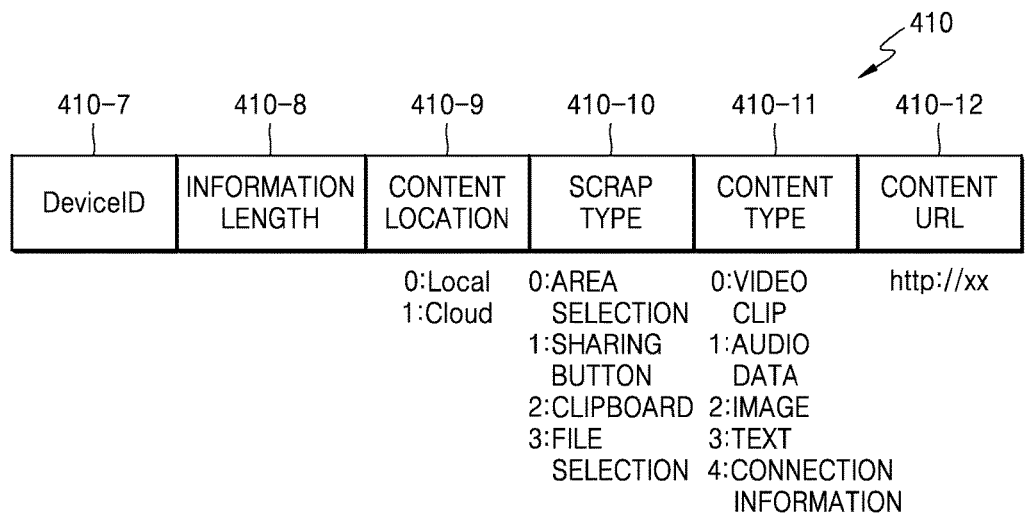
FIG. 15 illustrates a conceptual diagram of object information according to other exemplary embodiments.

FIG. 15 illustrates a conceptual diagram of the object information 410 according to other exemplary embodiments. According to an exemplary embodiment described with reference to FIG. 15, the object information 410 may include device identification information 410-7, an information length 410-8 of the object information 410, content location information 410-9, a scrap type 410-10, a content type 410-11, and a content URL 410-12.

The device identification information 410-7 may include information for identifying the information-providing device 1000-1. The information length 410-8 of the object information 410 refers to a length of the object information 410, for example, 10 bytes.

The information length 410-8 of the object information 410 may be used so that the information-receiving device 1000-2, which has received the object information 410, may determine whether all the object information 410 is received.

The content location information 410-9 is information indicating location information of the information of interest. For example, if a value of the content location information 410-9 is 0, the information-receiving device 1000-2 may determine that the information of interest is located in the information-providing device 1000-1, and obtain the information of interest based on the process described with reference FIGS. 6 and 7. If the content location information 410-9 of content is 1, the information-receiving device 1000-2 may determine that the information of interest is located in the server 500, and obtain the information of interest based on the process described with reference to FIGS. 4 and 5. The scrap type 410-10 may correspond to the method performed by the information-providing device 1000-1 to determine the information of interest. For example, if the scrap type 410-10 has a value of 0, this may indicate that the information of interest is determined based on an area selected by a user. If the scrap type 410-10 has a value of 1, this may indicate that the information of interest was determined by a user selecting a sharing button. If the scrap type 410-10 has a value of 2, this may indicate that the information of interest was stored in a clipboard of the information-providing device 1000-1. If the scrap type 410-10 has a value of 3, this may indicate that the information of interest was a file selected from a file list.

The content type 410-11 may indicate a form of the information of interest. According to a value of the content type 410-11, the information of interest may be determined to be a video clip, audio content, an image, text, or connection information. The information-receiving device 1000-2 may determine a method of outputting the received information of interest according to the content type 410-11.

The content URL 410-12 may include a URL through which the information of interest may be obtained. If the content URL 410-12 is included in the object information 410, the information-receiving device 1000-2 may output the information of interest using the content URL 410-12.

Figure 16:
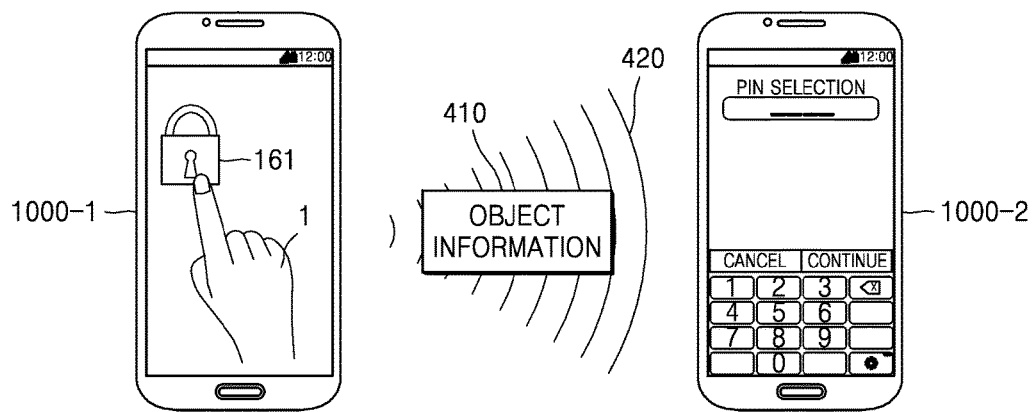
FIG. 16 illustrates a conceptual diagram of a method of sharing information using a personal identification number (PIN) according to some exemplary embodiments.

FIG. 16 illustrates a conceptual diagram of a method of sharing information using a PIN according to some exemplary embodiments.

The user 1 may share the information of interest in a security mode using a security mode setting button 161. If the security mode is set, the information-providing device 1000-1 may transmit the object information 410, which includes information indicating the security mode is set, to the information-receiving device 1000-2 using the sound signal 420. In this case, the information-receiving device 1000-2 may receive an input of a PIN from the user 1, so as to obtain the information of interest.

Referring to the exemplary embodiment shown in FIG. 5, in operation S520, the information-providing device 1000-1 may further transmit a PIN to the server 500. Then, if the sound signal 420 is received in operation S535, the information-receiving device 1000-2 may receive an input of the PIN from the user. In operation S540, the information-receiving device 1000-2 may further transmit the PIN to the server 500. In operation S550, the server 500 may compare the PIN received from the information-providing device 1000-1 to the PIN received from the information-receiving device 1000-2. If the two PINs are identical, the server 500 may transmit the information of interest to the information-receiving device 1000-2 in operation S550.

Referring to the exemplary embodiment described with reference to FIG. 7, if the sound signal 420 is received in operation S730, the information-receiving device 1000-2 may receive an input of a PIN from a user. In operation S750, the information-receiving device 1000-2 may further transmit the PIN to the information-providing device 1000-1. Then, the information-providing device 1000-1 may compare a PIN set for the information-providing device 1000-1 to the PIN received from the information-receiving device 1000-2. If the two PINs are identical, the information-providing device 1000-1 may transmit the information of interest to the information-receiving device 1000-2 in S760.

According to another exemplary embodiment, the information-providing device 1000-1 may transmit the object information 410, which includes a PIN, to the information-receiving device 1000-2. The information-receiving device 1000-2 may receive an input of a PIN from a user. In this case, the information-receiving device 1000-2 may compare the PIN included in the object information 410 to the PIN received from the user. If the two PINs are identical, information-receiving device 1000-2 may transmit the request in operation S540 or S750 to the server 500 or the information-providing device 1000-1.

FIG. 16 illustrates a conceptual diagram of a method of sharing information using a PIN according to some exemplary embodiments. The PIN may be substituted using another security method, for example, using a pattern input or a password.

FIG. 17 illustrates a conceptual diagram of a method of providing the information of interest to a registered device according to some exemplary embodiments. A user may select a device to receive the information of interest from a device list 170. As shown in FIG. 17, My phone 171 and PC1 172-1 may be selected as devices to receive the information of interest from among devices included in the device list 170, such as My phone 171, PC1 172-1, PC2 172-1, and Tablet1 172-3.

Then, if My Phone 171 is an information-providing device for providing the information of interest, My Phone 171 may generate a sound signal that includes group identification information. The group identification information refers to information for determining whether an information-receiving device is included in a group of the devices which are to receive the information of interest. PC1 172-1, PC2, 172-1, and Tablet1 172-3 may receive a sound signal that includes the group identification information. PC2 172-1, and Tablet1 172-3, which are not devices that are to receive the information of interest, may ignore the received sound signal. However, PC1 172-1 may download the information of interest based on the received sound signal.

Alternatively, device identification information of a device that is to receive the information of interest may be registered in the server 500 via an information-providing device shown in FIG. 4. The device identification information may be registered in the server 500 by other devices than the information-providing device. In this case, an information-receiving device, which has received a sound signal, may transmit a request that includes the device identification information of the information-receiving device to the server 500. If the device identification information included in the request is registered in the server 500, the server 500 may transmit the information of interest to the information-receiving device.

Figure 18:
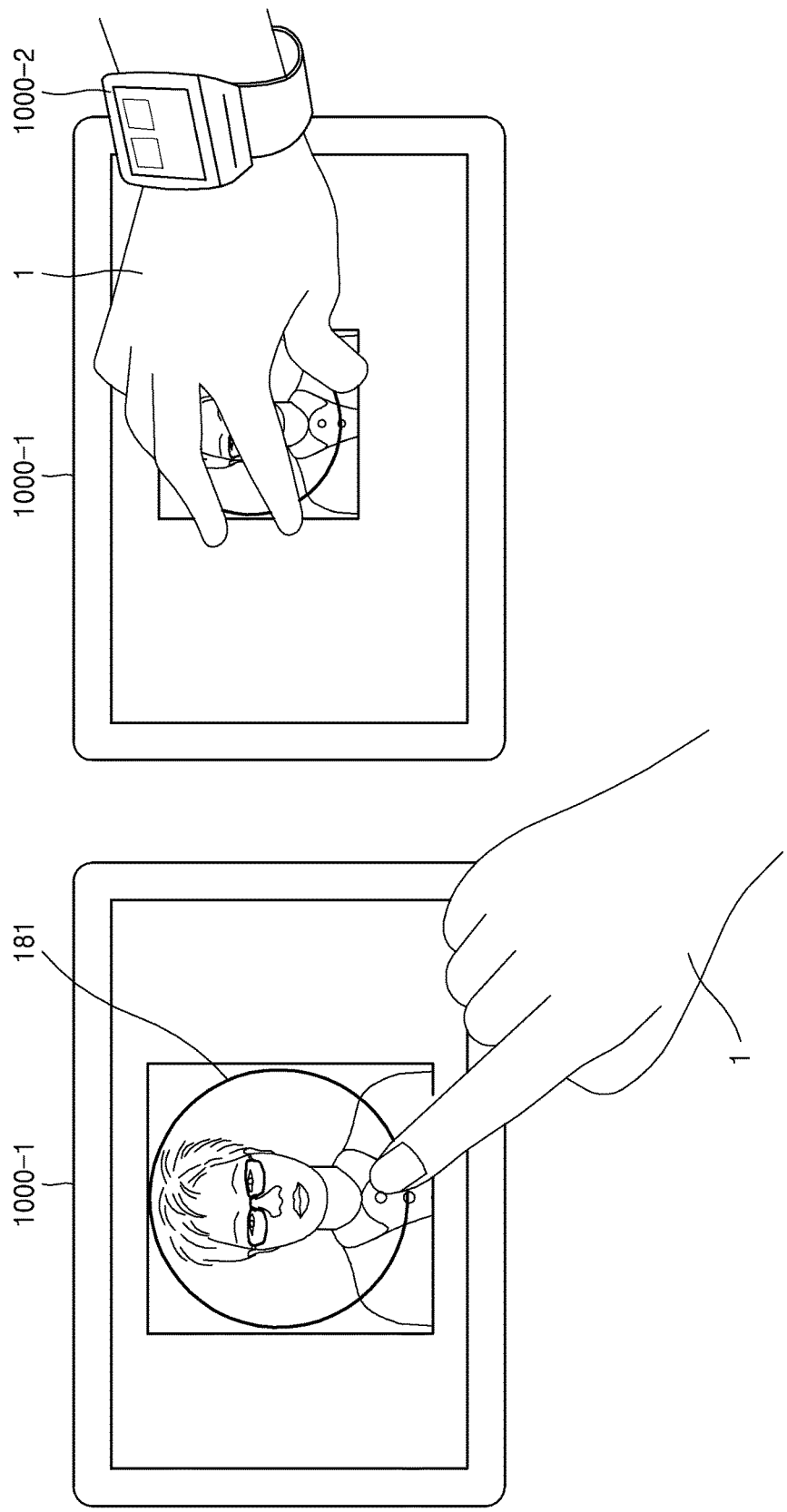
FIG. 18 illustrates a conceptual diagram of a method of sharing information according to some exemplary embodiments.

FIG. 18 illustrates a conceptual diagram of a method of sharing information according to some exemplary embodiments.

FIG. 18 shows an exemplary embodiment in which the information-providing device 1000-1 is a tablet PC, and the information-receiving device 1000-2 is a wearable device in the form of a watch. The user 1 may perform a touch input on a screen of the information-providing device 1000-1 which is a touchscreen. The information-providing device 1000-1 may recognize a trajectory 181 of a touch input as a first input. In other words, the information-providing device 1000-1 may determine a part of an area of the screen based on the trajectory 181 of the touch input. The information-providing device 1000-1 may determine an image that includes the determined part of the area as the information of interest. Then, the user 1 may input a gesture of contacting the touchscreen of the information-providing device 1000-1 with tips of his/her fingers, and then, making a pinching motion on the determined part of the area on the screen of the information-providing device 1000-1. The information-providing device 1000-1 may recognize the gesture as a second input. When the gesture is input, the information-providing device 1000-1 may generate a sound signal. When the information-receiving device 1000-2 receives the sound signal, the information-receiving device 1000-2 may obtain the image determined as the information of interest.

According to the exemplary embodiment described with reference to FIG. 18, if the user 1 makes a pinching motion with his/her fingers on the determined part of the area on the screen of the information-providing device 1000-1, an image of the determined part of the area on the screen may be transmitted to the information-receiving device 1000-2.

Figure 19:
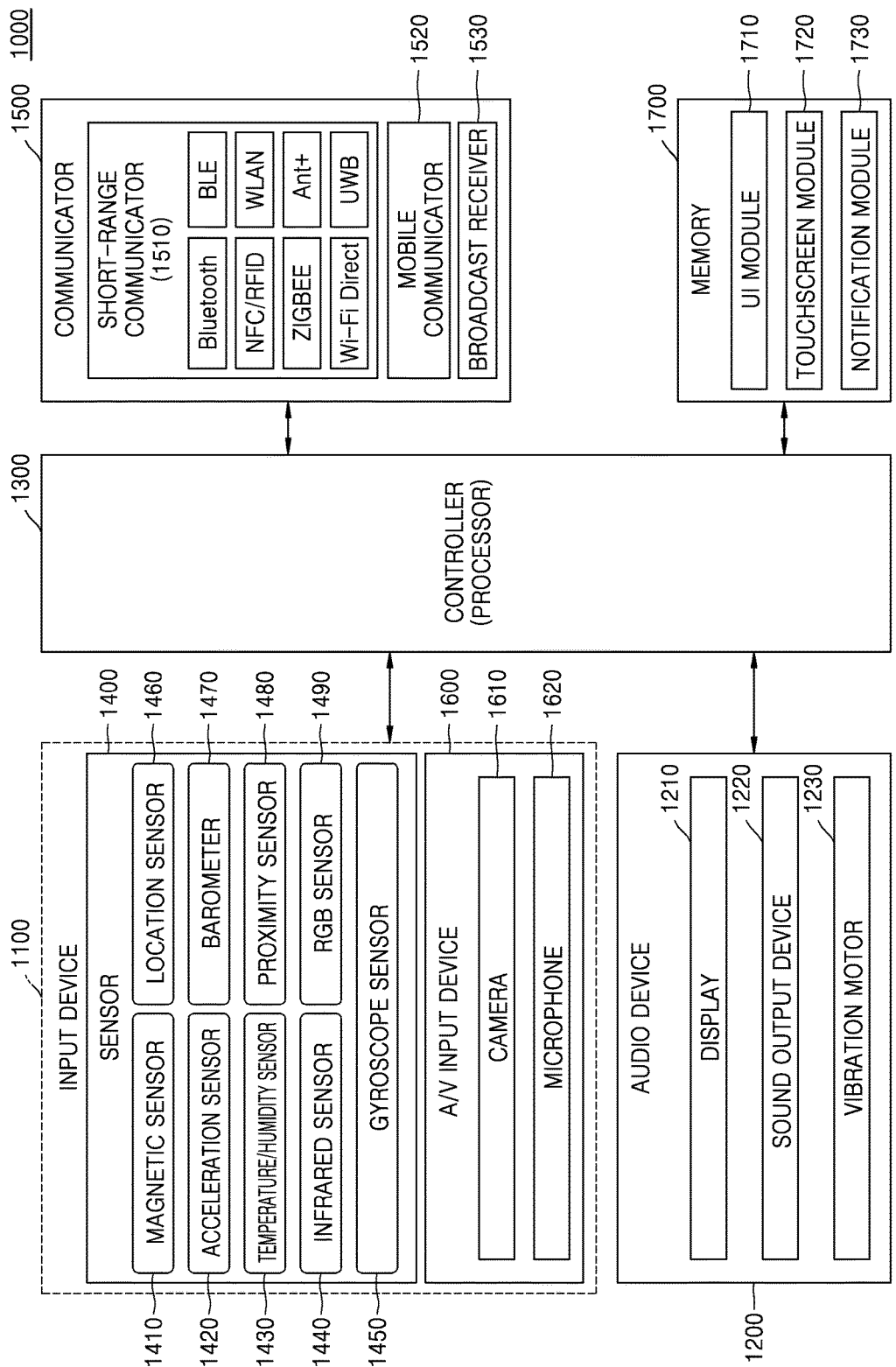
FIG. 19 is a block diagram of an information-providing device or the information-receiving device according to some exemplary embodiments.

FIG. 19 illustrates a block diagram of a terminal 1000 according to some exemplary embodiments. According to some exemplary embodiments, the terminal 1000 may include an input device 1100, an output device 1200, i.e., an output unit, a communicator 1500, i.e., a transceiver or a communication device, a memory 1700, and a controller 1300, i.e., a processor. The information-providing device 1000-1 or the information-receiving device 1000-2 may include a structure of the terminal 1000 shown in FIG. 19. However, FIG. 19 is provided to describe only some exemplary embodiments. The information-providing device 1000-1 or the information-receiving device 1000-2 may include additional elements, or may not include all of the elements shown in FIG. 19. The elements shown in FIG. 19 may be substituted by other similar elements.

The input device 1100 refers to a device that may receive an input of data for controlling the terminal 1000. The input device 1100 and the output device 1200 are shown as separate units in FIG. 19. However, the input device 1100 and the output device 1200 may be implemented as one piece of hardware such as a touchscreen in which a display and a touch pad form a layered structure to constitute a touch screen. The input device 1100 may refer to a device to which a user inputs data for controlling the terminal 1000. For example, the input device 1100 may include a key pad, a dome switch, a touch pad, being one of a capacitive overlay type, a resistive overlay type, an infrared beam type, a surface acoustic wave type, an integral strain gauge type, or a piezo electric type, a jog wheel, or a jog switch, but is not limited thereto.

The input device 1100 may include a sensor 1400, i.e., a sensing unit, and an audio-video (A/V) input device 1600, i.e., an A/V input interface or an A/V input unit.

The sensor 1400 may sense a state of the terminal 1000 or a state near the terminal 1000, and transmit information obtained by the sensing to the controller 120. The sensor 1400 may include at least one selected from among a magnetic sensor 1410, an acceleration sensor 1420, a temperature/humidity sensor 1430, an infrared sensor 1440, a gyroscope sensor 1450, a location sensor 1460, for example, a global positioning system (GPS), a barometer 1470, a proximity sensor 1480, and a red-green-blue (RGB) sensor (illuminance sensor) 1490, but is not limited thereto. Functions of the respective sensors may be inferred from the name of the modules by one of ordinary skill in the art. Thus, a detailed description thereof will not be provided here.

The A/V input device 1600 is a device into which audio or video signals are input, and may include a camera 1610 and a microphone 1620. In a video phone mode or a photographing mode, the camera 161 may obtain an image frame such as a still image or a moving image through an image sensor. An image captured through the image sensor may be processed by the controller 1300 or an additional image processing unit.

The image frame processed by the camera 1610 may be stored in the memory 1700 or transmitted to an external device through the communicator 1500. The A/V input device 1600 may include two or more cameras 1610 according to a configuration type of the terminal 1000.

The microphone 1620 receives an external sound signal and processes the external sound signal into electrical voice data. For example, the microphone 1620 may receive a sound signal from an external device or a person who speaks into the microphone. The microphone 1620 may employ various noise removal algorithms for removing noise that may be generated in a process of receiving an external sound signal.

The output device 1200 outputs an audio signal, a video signal, or a vibration signal. The output device 1200 may include a display 1210, an audio output device 1220, i.e., an audio output unit, e.g., a speaker, and a vibration motor 1230.

The display 1210 may include at least one selected from among a liquid crystal display (LCD), a thin-film transistor-liquid crystal display (TFT-LCD), an organic light-emitting diode (OLED), a flexible display, a 3-dimensional (3D) display, and an electrophoretic display. According to an implementation type of the terminal 1000, the first device

100 may include two or more display 1210. The two or more display 1210 may be disposed to face each other using a hinge.

The audio output device 1220 outputs audio data which is received from the communicator 1500 or stored in the memory 1700. The audio output device 1220 outputs an audio signal related to functions performed by the terminal 1000, for example, a call signal reception sound, a message reception sound, a notification sound, etc. The audio output device 1220 may include a speaker, a buzzer, or so on.

The vibration motor 1230 may output a vibration signal. The vibration motor 1230 may output a vibration signal which corresponds to an output of audio data or video data, for example, a call signal reception sound, a message reception sound, etc. Additionally, the vibration motor 1230 may output a vibration signal if a touch is input to a touchscreen.

The controller 1300 may generally control all operations of the terminal 1000. For example, the controller 1300 may execute programs stored in the memory 1700 so as to control elements included in the terminal 1000.

The communicator 1500 may include one or more elements for communication between the terminal 1000 and an external device. For example, the communicator 1500 may include a short-range communicator 1510, a mobile communicator 1520, and a broadcast receiver 1530.

The short-range communicator 151 may include a Bluetooth communication module, a Bluetooth low energy (BLE) communication module, a near field communication (NFC) module, a wireless local area network (WLAN) Wi-Fi communication module, a Zigbee communication module, an infrared Data Association (IrDA) communication module, a Wi-Fi Direct (WFD) communication module, a ultra wideband (UWB) communication module, or an Ant+ communication module, but is not limited thereto.

The mobile communicator 1520 sends and receives a wireless signal with at least one selected from among a base station, an external terminal, and a server on a mobile communication network. The wireless signals may include a voice call signal, a video phone call signal, or various forms of data signals used to transceive text or multimedia messages.

The broadcast receiver 1530 receives broadcast signals and/or broadcast-related information, via a broadcast channel. The broadcast channel may be a satellite channel and a terrestrial broadcast channel. According to one or more exemplary embodiments, the terminal 1000 may not include the broadcast receiver 1530.

The memory 1700 may store a program for processing and controlling the controller 1300. The memory 270 may also store data which is input to or output from the terminal 1000.

The memory 1700 may include at least one storage medium selected from among a flash memory, a hard disk, a multimedia card micro, a card-type memory such as a secured digital (SD) or extreme digital (XD) memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

Programs, stored in the memory 270, may be classified into a plurality of modules according to their functions. For example, the programs may be classified into a UI module 1710, a touchscreen module 1720, and a notification module 1730.

The UI module 1710 may provide a specialized UI or GUI which works with the terminal 1000 according to various applications. The touchscreen module 1720 may detect a touch gesture on a touchscreen by a user and transmit information about the touch gesture to the control device 1300. According to some exemplary embodiments, the touchscreen module 1720 may recognize and analyze a touch code. The touchscreen module 1720 may include additional hardware, such as a controller.

Various types of sensors may be disposed inside or near the touchscreen, so as to detect a touch or a proximity touch on the touchscreen. An example of a sensor for detecting a touch on the touchscreen may be a tactile sensor. The tactile sensor is a sensor for detecting contact with a particular object, sensitive to a degree similar to that of human touch perception. The tactile sensor may detect various types of information such as information about a roughness of a contact surface, a hardness of a contact object, or a temperature at a contact point.

Additionally, an example of a sensor for detecting a touch on the touchscreen is a proximity sensor.

The proximity sensor is a sensor for detecting an object which approaches a detection surface or a neighboring object using the strength of an electromagnetic field or infrared light without a mechanical contact. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. Touch gestures of a user may include a tap, a touch and hold, a double-tap, a drag, panning, a flick, a drag-and-drop, and a swipe.

The notification module 1730 may generate a signal indicating generation of an event in the terminal 1000. Examples of the event generated in the terminal 1000 may include call signal reception, a message reception, a key signal input, and a schedule notification. The notification module 1730 may output a notification signal in the form of a video signal via the display 1210 or in the form of an audio signal via the audio output device 1220. The notification module 1730 may also output a notification signal in the form of a vibration signal via the vibration motor 1230.

Figure 20:
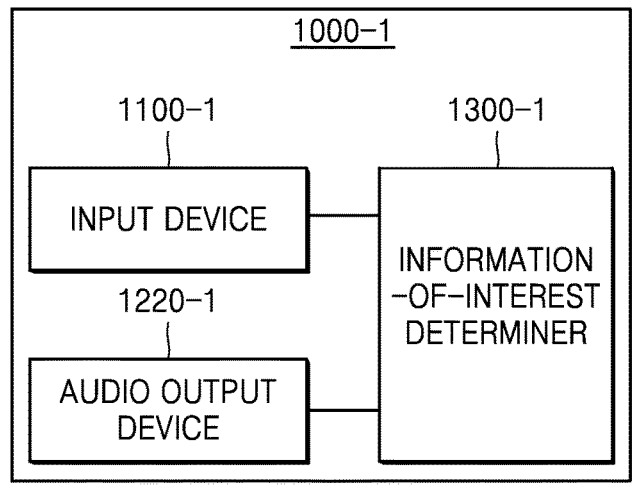
FIG. 20 is a block diagram of an information-providing device according to some exemplary embodiments.

FIG. 20 illustrates a block diagram of the information-providing device 1000-1 according to some exemplary embodiments. According to some exemplary embodiments, the information-providing device 1000-1 may include an input device 1100-1, an audio output device 1220-1, and an information-of-interest determiner 1300-1, i.e., a processor.

The input device 1100-1 may receive a first input with respect to the information-providing device 1000-1. The first input may vary according to various exemplary embodiments. For example, the first input may be an input such as a command selecting text, selecting an area of a screen, or storing to a clipboard.

The information-of-interest determiner 1300-1 may determine the information of interest based on a first input made via the input device 1100-1. According to some exemplary embodiments, the information-of-interest determiner 1300-1 may include the controller 1300 shown in FIG. 19. As shown in FIGS. 8 through 11, the information of interest may vary according to a type of the first input.

The audio output device 1220-1 may generate a sound signal that includes object information. The object information is information related to the information of interest. The object information refers to information that the information-receiving device 1000-2 may use to identify and obtain the information of interest. The audio output device 1220-1 may include a speaker for generating a sound signal.

According to some exemplary embodiments, the audio output device 1220-1 may generate a sound signal if a second input is input via the input device 1100-1. According to some exemplary embodiments, if a user holds and shakes the information-providing device 1000-1, the information-providing device 1000-1 may detect a second input indicating physical movement of the information-providing device 1000-1. The physical movement may be detected by an acceleration sensor or a gyroscope sensor.

Figure 21:
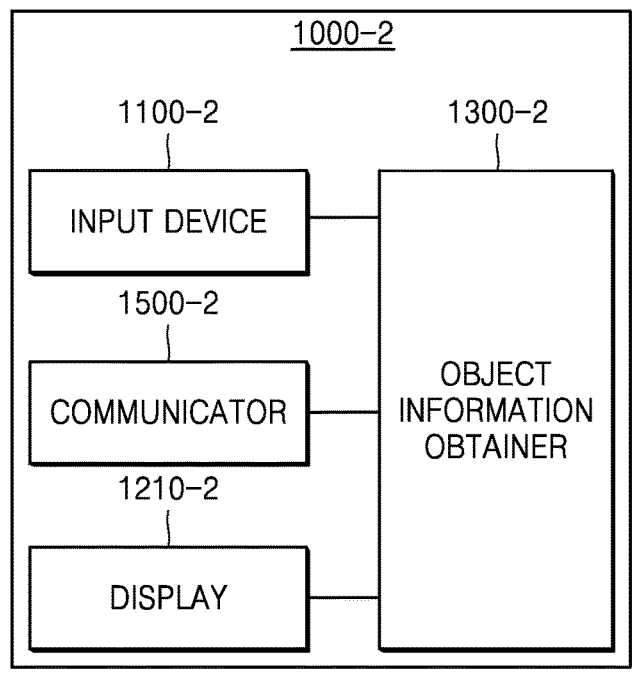
FIG. 21 is a block diagram of an information-receiving device according to some exemplary embodiments.

FIG. 21 illustrates a schematic block diagram of a structure of the information-receiving device 1000-2 according to some exemplary embodiments. According to some exemplary embodiments, the information-receiving device 1000-2 may include an input device 1100-2, a communicator 1500-2, a display 1210-2, and an object information obtainer 1300-2, i.e., a processor.

The input device 1100-2 may obtain a sound signal from the information-providing device 1000-1. According to some exemplary embodiments, the information-receiving device 1000-2 may receive a sound signal using the microphone 1620 shown in FIG. 19.

The object information obtainer 1300-2 may decode the sound signal received from the input device 1100-2. The object information obtainer 1300-2 may obtain object information by decoding the sound signal. According to some exemplary embodiments, the object information may include a command with respect to the information-receiving device 1000-2. The object information obtainer 1300-2 may execute the command included in the object information.

Additionally, according to some exemplary embodiments, the object information may include group identification information. If the object information includes the group identification information, the information-obtainer 1300-2 may determine whether identification information of the information-receiving device 1000-2 is included in the group identification information. If the identification information of the information-receiving device 1000-2 is not included in the group identification information, the information-obtainer 1300-2 may ignore the received sound signal. However, if the identification information of the information-receiving device 1000-2 is included in the group identification information, the information-obtainer 1300-2 may download the information of interest using the communicator 1500-2, based on the object information included in the sound signal.

The communicator 1500-2 may download the information of interest. For example, if the information of interest is stored in a server, the communicator 1500 may transmit the object identification information to the server. The communicator 1500-2 may receive the information of interest from the server. According to another exemplary embodiment, the communicator 1500-2 may connect to the information-providing device 1000-1 using a short-range wireless communication based on the object information. The object information may include connection information for connecting the information-providing device 1000-1 to the short-range wireless communication. The connection information refers to device identification information of the information-providing device 1000-1 or information for setting a short-range wireless communication, such as a protocol. The communicator 1500-2 may download the information of interest from the information-providing device 1000-1 using the short-range wireless communication.

The display 1210-2 may output the downloaded information of interest. According to exemplary embodiments, the display 1210-2 may be substituted by another output device.

In addition, other exemplary embodiments can also be implemented through computer-readable code/instructions in/on a medium, e.g., a non-transitory computer-readable medium, to control at least one processing element to implement any of the above-described exemplary embodiments. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method of an information-providing device of sharing information, the method comprising:
    determining, by the information-providing device, information of interest based on a user input to the information-providing device;
    uploading, by the information-providing device, the information of interest to a server;
    receiving, by the information-providing device, object identification information from the server;
    generating, by the information-providing device, a sound signal comprising object information based on the received object identification information in response to detecting a physical movement of the information-providing device; and
    outputting, by the information-providing device, the sound signal,
    wherein the object information comprises the object identification information that identifies a location of the information of interest.

2. The method of claim 1, wherein the information-providing device comprises a display,
    wherein the user input indicates a selection of a part of content displayed on the display, and
    wherein the determining the information of interest comprises determining the selected part of the content as the information of interest.

3. The method of claim 1, wherein the information-providing device comprises a display, wherein the method further comprises displaying, on the display, an information-of-interest determining button configured to receive the user input, and wherein the determining the information of interest comprises receiving the user input using the information-of-interest determining button.

4. A method of an information-receiving device of receiving information from an information-providing device, the method comprising:
   receiving, by the information-receiving device, a sound signal comprising object information;
   obtaining, by the information-receiving device, the object information included in the sound signal;
   downloading, by the information-receiving device, information of interest based on the object information; and
   outputting, by the information-receiving device, the downloaded information of interest,
   wherein the object information comprises object identification information that identifies a location of the information of interest,
   wherein the downloading of the information of interest comprises:
      transmitting, by the information-receiving device, a request comprising the object identification information to a server; and
      receiving, by the information-receiving device, the information of interest from the server in response to the request, and
   wherein the sound signal is generated by the information-providing device in response to detecting a physical movement of the information-providing device.

5. The method of claim 4, wherein the information of interest comprises an image generated by capturing a part of a screen displayed on a display of the information-providing device.

6. A method of sharing information, which is performed by a system that comprising an information-providing device, an information-receiving device, and a server, the method comprising:
   determining, by the information-providing device, information of interest based on a user input to the information-providing device;
   uploading, by the information-providing device, the determined information of interest to the server;
   transmitting, by the server, object identification information configured to be used to identify the uploaded information of interest to the information-providing device;
   generating, by the information-providing device, a sound signal comprising object information in response to detecting a physical movement of the information-providing device;
   transmitting, by the information-receiving device, a request comprising the object identification information, to the server; and
   transmitting, by the server, the uploaded information of interest to the information-receiving device in response to the request,
   wherein the object information comprises the object identification information.

7. The method of claim 6, wherein the information-providing device comprises a display,
   wherein the user input comprises an input indicating a selection of a part of content displayed on the display, and
   wherein the determining of the information of interest comprises determining, by the information-providing device, the selected part of the content as the information of interest.

8. The method of claim 6, wherein the object information further comprises at least one selected from among a command to download the information of interest to be performed by the information-receiving device, user identification information, device identification information, and a token configured to be used to determine whether the request for the information of interest is valid.

9. An information-providing device comprising:
   a user interface configured to receive a user input;
   a processor configured to determine information of interest based on the user input;
   a sensor configured to detect a physical movement of the information-providing device;
   a transceiver configured to transmit the information of interest to a server, to receive object identification information from the server; and
   an audio output unit configured to generate a sound signal comprising object information corresponding to the information of interest based on the received object identification information, in response to the sensor detecting the physical movement of the information-providing device,
   wherein the object information comprises the object identification information that identifies a location of the information of interest.

10. The information-providing device of claim 9, further comprising a display,
    wherein the user input comprises a touch input indicating a selection of a part of content displayed on the display, and
    wherein the processor is further configured to determine the selected part of the content as the information of interest.

11. An information-receiving device comprising:
    a user interface configured to receive a sound signal comprising object information from a information-providing device;
    a processor configured to obtain the object information included in the sound signal;
    a transceiver configured to download information of interest based on the object information; and
    a display unit configured to display the information of interest,
    wherein the object information comprises object identification information that identifies a location of the information of interest, and
    wherein the transceiver is further configured to transmit a request including the object identification information to a server, and to receive the information of interest from the server in response to the request, and
    wherein the sound signal is generated by the information-providing device in response to detecting a physical movement of the information-providing device.

12. The information-receiving device of claim 11, wherein the information of interest comprises an image generated by capturing a part of a screen displayed on the display unit.

13. A non-transitory computer-readable recording storage medium having stored thereon a computer program, which when executed by a computer, performs the method of claim 1.

* * * * *